(12) United States Patent  (10) Patent No.: US 9,013,137 B2
Aoki et al.  (45) Date of Patent: Apr. 21, 2015

(54) APPARATUS FOR CALCULATING ROTATIONAL POSITION OF ROTARY MACHINE

(75) Inventors: Yasuaki Aoki, Kariya (JP); Hiroko Yoneshima, Kariya (JP); Tomoya Takahashi, Anjo (JP)

(73) Assignee: Denso Corporation, Kariya (JP)

( * ) Notice: Subject to any disclaimer, the term of this patent is extended or adjusted under 35 U.S.C. 154(b) by 550 days.

(21) Appl. No.: 13/406,883

(22) Filed: Feb. 28, 2012

(65) Prior Publication Data

US 2012/0217849 A1   Aug. 30, 2012

(30) Foreign Application Priority Data

Feb. 28, 2011   (JP) .................. 2011-041649

(51) Int. Cl.
    *H02P 23/00* (2006.01)
    *H02P 6/18* (2006.01)
    *H02P 21/00* (2006.01)
    *H02P 21/14* (2006.01)

(52) U.S. Cl.
    CPC .... *H02P 6/18* (2013.01); *H02P 6/183* (2013.01); *H02P 21/0042* (2013.01); *H02P 21/146* (2013.01)

(58) Field of Classification Search
    USPC ................... 318/727, 767, 807, 810
    See application file for complete search history.

(56) References Cited

U.S. PATENT DOCUMENTS

| 2001/0002784 | A1 | 6/2001 | Masaki et al. | |
|---|---|---|---|---|
| 2006/0049784 | A1* | 3/2006 | Suzuki | 318/139 |
| 2008/0111516 | A1* | 5/2008 | Inokuma | 318/799 |
| 2008/0197799 | A1* | 8/2008 | Tomigashi | 318/768 |
| 2010/0134053 | A1* | 6/2010 | Yamada et al. | 318/162 |
| 2010/0259204 | A1* | 10/2010 | Imura | 318/400.02 |
| 2011/0080127 | A1* | 4/2011 | Akama et al. | 318/400.21 |
| 2011/0221382 | A1* | 9/2011 | Hayashi | 318/801 |
| 2012/0056574 | A1* | 3/2012 | Arisawa | 318/696 |
| 2012/0206077 | A1* | 8/2012 | Yoneshima et al. | 318/400.33 |

FOREIGN PATENT DOCUMENTS

| JP | 11-069884 | | 3/1999 | |
|---|---|---|---|---|
| JP | 2002095262 | A * | 3/2002 | ............ H02M 7/48 |
| JP | 3312472 | | 5/2002 | |
| JP | 2003-153582 | | 5/2003 | |

(Continued)

OTHER PUBLICATIONS

Translation JP2002095262A.*

(Continued)

*Primary Examiner* — Kawing Chan
(74) *Attorney, Agent, or Firm* — Nixon & Vanderhye, P.C.

(57) ABSTRACT

In a system for driving an inverter, a superimposing element superimposes, on an output voltage of the inverter. The high-frequency voltage signal is correlated with a measured high-frequency component value of a current flowing in the rotary machine. A calculating element calculates a rotational angle of the rotary machine based on the measured high-frequency component value. A dead-time compensating element shifts a start edge and an end edge of an on duration for each of first and second switching elements of the inverter by a preset same time to compensate for an error due to dead time. A current manipulating element manipulates a current flowing in the rotary machine to maintain an accuracy of calculation of the rotational angle.

17 Claims, 19 Drawing Sheets

(56) References Cited

FOREIGN PATENT DOCUMENTS

| | | |
|---|---|---|
| JP | 3454212 | 7/2003 |
| JP | 2004-147430 | 5/2004 |
| JP | 3578096 | 7/2004 |
| JP | 2008-054430 | 3/2008 |

OTHER PUBLICATIONS

Translation JP2004147430A.*
Office Action (2 pages) dated Feb. 26, 2013, issued in corresponding Japanese Application No. 2011-041649 and English translation (2 pages).

* cited by examiner

COMPARISON EXAMPLE

FIRST EMBODIMENT

APPARATUS FOR CALCULATING ROTATIONAL POSITION OF ROTARY MACHINE

CROSS REFERENCE TO RELATED APPLICATIONS

This application is based on and claims the benefit of priority from Japanese Patent Application 2011-041649 filed on Feb. 28, 2011, the disclosure of which is incorporated in its entirety by reference.

TECHNICAL FIELD

The present disclosure relates to apparatuses for calculating the rotational position of a rotary machine.

BACKGROUND

An example of various types of control systems for a three-phase motor is disclosed in Japanese Patent No. 3312472.

A control system disclosed in the patent Publication superimposes, on an output signal from an inverter, a high-frequency voltage signal oscillating in the positive and negative directions in an estimated d-axis of a salient three-phase motor, and estimates the rotation angle of the motor based on a high-frequency current signal actually created in the motor.

The salient structure (salient characteristic) of the three-phase motor means a characteristic in which a magnetic resistance created in the d-axis of the three-phase motor is higher than that created in a q-axis thereof. In other words, the salient structure (salient characteristic) of the three-phase motor means a characteristic in which inductance in the d-axis of the three-phase motor is lower than that in the q-axis thereof.

SUMMARY

The frequency of the high-frequency voltage signal superimposed on the output signal of the inverter is normally set to be within an audible frequency range. For this reason, this high-frequency voltage superimposing method may cause noise to occur audibly recognizable by humans in estimating the rotational angle of the three-phase motor. In order to reduce such noise, it is effective in reducing in magnitude in the high-frequency voltage signal. However, the inventors of the present disclosure have found out that the reduction in magnitude in the high-frequency voltage signal may reduce the accuracy of estimating the rotational angle of the three-phase motor.

In view of the circumstances set forth above, one aspect of the present disclosure seeks to provide apparatuses for calculating the rotational position of a rotary machine, which are capable of addressing such a problem set forth above.

Specifically, an alternative aspect of the present disclosure aims to provide such apparatuses capable of calculating the rotational position of a rotary machine with noise caused by the calculation process being kept low.

According to a first exemplary aspect of the present disclosure, there is provided a system for driving an inverter equipped with a first switching element, a first diode connected in antiparallel to the first switching element, a second switching element, and a second diode connected in antiparallel to the second switching element. This results in the inverter connecting a terminal of a salient rotary machine selectively to one of a positive terminal and a negative terminal of a direct voltage power supply via a corresponding one of the first and second switching elements to thereby control a controlled variable of the rotary machine. The first and second switching elements are turned on or off with a dead time during which both the first and second switching elements are off. The system includes a superimposing element configured to superimpose a high-frequency voltage signal on an output voltage of the inverter. The high-frequency voltage signal has a frequency higher than an electrical angular frequency of the rotary machine. The high-frequency voltage signal is correlated with a measured high-frequency component value of a current flowing in the rotary machine. The system includes a calculating element configured to calculate a rotational angle of the rotary machine based on the measured high-frequency component value of the current flowing in the rotary machine. The system includes a dead-time compensating element configured to shift a start edge and an end edge of an on duration for each of the first and second switching elements by a preset same time to compensate for an error due to the dead time. The system includes a current manipulating element configured to manipulate the current flowing in the rotary machine to maintain an accuracy of calculation of the rotational angle of the rotary machine.

In the first exemplary aspect of the present disclosure, voltage applied to the terminal of the rotary machine by the inverter during dead time depends on the polarity of current flowing through the terminal. During the dead time, the voltage applied to the terminal of the rotary machine may become an error against the high-frequency voltage signal to be intentionally applied on the output of the inverter by the superimposing element. The percentage of the error voltage in a high-voltage signal to be actually superimposed increases with reduction in the high-frequency voltage signal to be intentionally applied on the output of the inverter. For this reason, the smaller the high-frequency voltage signal intentionally applied by the superimposing element on the output of the inverter is, the more increases an error in the high-frequency voltage signal relative to the high-frequency voltage signal to be actually superimposed intentionally applied by the superimposing element on the output of the inverter.

From this viewpoint, the control system according to the first exemplary aspect of the present disclosure is provided with the dead-time compensating element that shifts the start edge and the end edge of an on duration for each of the first and second switching elements by a preset same time to compensate for an error due to the dead time.

However, even if the dead-time compensating element is provided, there may be a risk of reduction in the accuracy of calculation of the rotational angle of the rotary machine due to, for example, a zero crossing period during which an absolute level of a current flowing in the rotary machine is equal to or lower than a preset threshold level. Thus, the current measuring element according to the first exemplary aspect of the present disclosure manipulates the current flowing in the rotary machine to maintain the accuracy of calculation of the rotational angle of the rotary machine, thus avoiding reduction in the accuracy of calculation of the rotational angle of the rotary machine.

According to a second exemplary aspect of the present disclosure, there is provided a system for driving an inverter equipped with a first switching element, a first diode connected in antiparallel to the first switching element, a second switching element, and a second diode connected in antiparallel to the second switching element. This results in that the inverter connects a terminal of a salient rotary machine selectively to one of a positive terminal and a negative terminal of a direct voltage power supply via the respective first and second switching elements to thereby control a controlled variable of the rotary machine. The first and second switching elements are turned on or off with a dead time during which both the first and second switching elements are off. The system includes a superimposing element configured to superimpose a high-frequency voltage signal on an output voltage of the inverter. The high-frequency voltage signal has a frequency higher than an electrical angular frequency of the rotary machine. The high-frequency voltage signal is correlated with a measured high-frequency component value of a current flowing in the rotary machine. The system includes a calculating element configured to calculate a rotational angle of the rotary machine based on the measured high-frequency component value of the current flowing in the rotary machine. The system includes a dead-time compensating element configured to shift a start edge and an end edge of an on duration for each of the first and second switching elements by a preset same time to compensate for an error due to the dead time. The system includes a current manipulating element configured to manipulate a command current for controlling the controlled variable of the rotary machine to reduce the error due to the dead time.

In the second exemplary aspect of the present disclosure, even if the dead-time compensating element is provided set forth above, the error due to the dead time may remain due to, for example, a zero crossing period during which an absolute level of a current flowing in the rotary machine is equal to or lower than a preset threshold level. Thus, the current measuring element according to the second exemplary aspect of the present disclosure manipulates the command current for controlling the controlled variable of the rotary machine to reduce the error due to the dead time. This avoids reduction in the accuracy of calculation of the rotational angle of the rotary machine.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be constructed as limiting other embodiments or the claims.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

Figure 1:
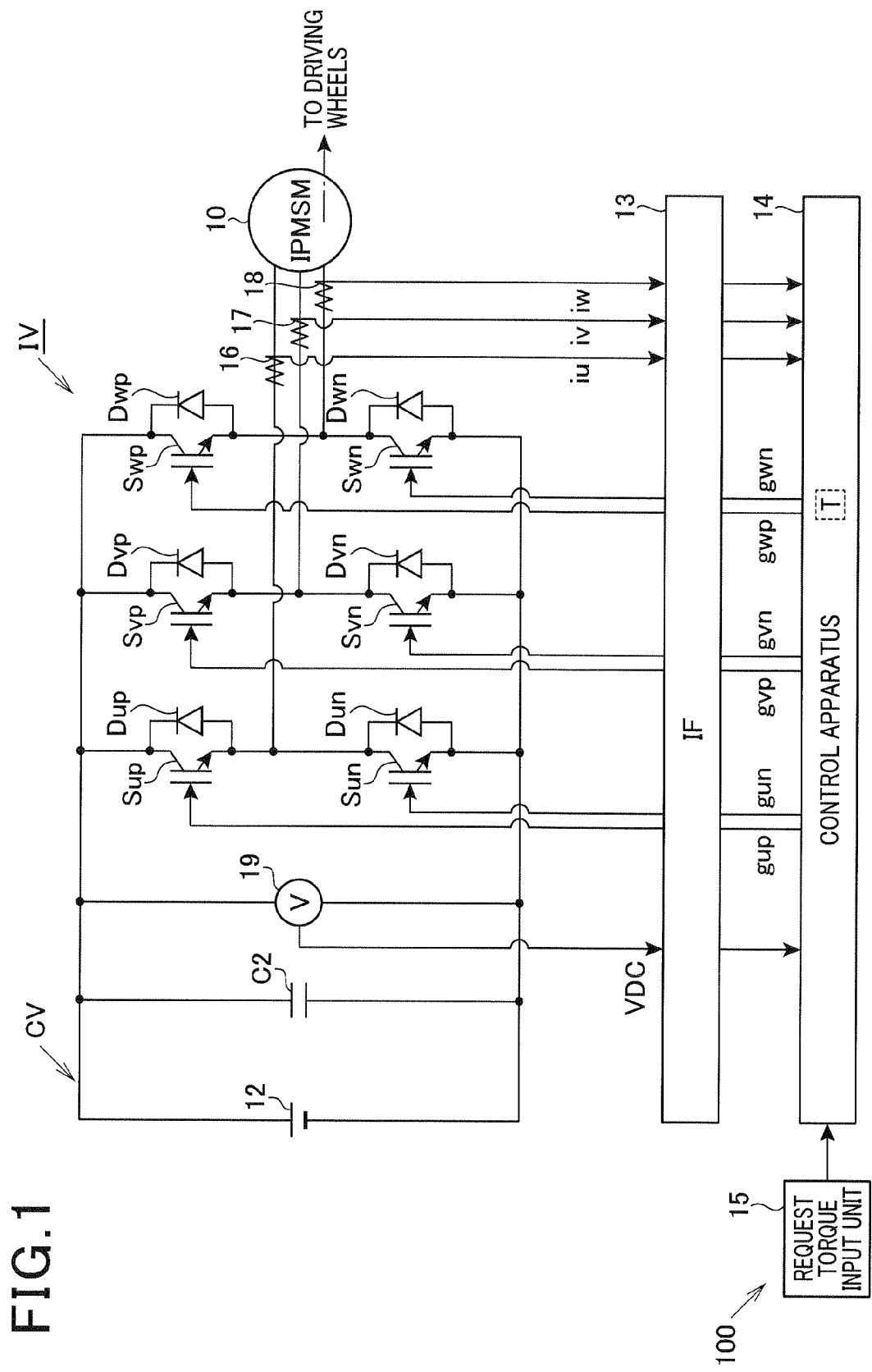
FIG. 1 is a circuit diagram of a control system according to the first embodiment of the present disclosure.

Embodiments of the present disclosure will be described hereinafter with reference to the accompanying drawings. In the embodiments, like parts between the embodiments, to which like reference characters are assigned, are omitted or simplified to avoid redundant description.

First Embodiment

Referring to FIG. 1, there is illustrated a three-phase motor-generator as an example of rotary machines, referred to simply as a "motor-generator" 10, installed in, for example, a motor vehicle as an energy source (a main engine) of the motor vehicle according to the first embodiment. As the motor-generator 10, a motor having a salient-pole structure is used. For example, as the motor-generator 10, an IPMSM (Interior Permanent Magnet Synchronous Motor) is used.

In FIG. 1, there is also illustrated a control system 100. The control system 100 is equipped with an inverter (converter) IV serving as a circuit for applying a variable output voltage to the motor-generator 10, a capacitor C, a high-voltage battery 12, an interface 13, and a control apparatus 14. The high-voltage battery 12 serves as, for example, a direct voltage power supply.

Specifically, the motor-generator 10 and the high-voltage battery 12 can establish electrical connection therebetween via the inverter IV.

For example, the motor-generator 10 is provided with an annular rotor having an iron rotor core. The iron rotor core is coupled to the driving wheels of the motor vehicle and, for example, directly or indirectly coupled to a crankshaft of an engine installed in the motor vehicle.

The rotor has a salient-pole structure.

Specifically, the rotor core of the rotor is provided at its circumferential portions with at least one pair of permanent magnets. The permanent magnets of the at least one pair are so embedded in the outer periphery of the rotor core as to be symmetrically arranged with respect to the center axis of the rotor core at regular intervals in a circumferential direction of the rotor core.

One permanent magnet of the at least one pair has a north pole (N pole) directed radially outward away from the center of the rotor core. The other permanent magnet has a south pole (S pole) directed radially outward away from the center of the rotor core.

The rotor has a direct axis (d-axis) in line with a direction of magnetic flux created by the N pole, in other words, in line with a rotor N pole center line. The rotor also has a quadrature axis (q-axis) with a phase being $\pi/2$ radian electric angle leading with respect to a corresponding d-axis during rotation of the rotor. In other words, the q-axis is electromagnetically orthogonal to the d-axis.

The d and q axes constitute a d-q coordinate system (rotating coordinate system) defined in the rotor of the motor-generator 10.

An inductance Ld in the d-axis is lower than an inductance Lq in the q-axis because the permanent magnets have a magnetic permeability constant lower than that of the iron. Motors having a salient-pole structure means motors each having this inductance characteristic of the rotor.

The motor-generator 10 is also provided with a stator. The stator includes a stator core with, for example, an annular shape in its lateral cross section. The stator core is disposed around the outer periphery of the rotor core such that the inner periphery of the stator core is opposite to the outer periphery of the rotor core with a predetermined air gap.

For example, the stator core also has a plurality of slots. The slots are formed through the stator core and are circumferentially arranged at given intervals. The stator also includes a set of three-phase windings (armature windings) wound in the slots of the stator.

The three-phase windings are wound in the slots such that the U-, V-, and W-phase windings are shifted by an electric angle of, for example, $\pi/3$ radian in phase from each other.

For example, the three-phase armature windings (U-, V-, and W-phase windings) each have one end connected to a common junction (neutral point) and the other end to a separate terminal in, for example, a star-configuration.

The motor-generator 10 is operative to receive at its three-phase windings three-phase currents to generate a rotating magnetic flux; this allows the rotor to turn based on magnetic attractive force between the rotating magnetic flux and a magnetic flux of the rotor. The capacitor C is parallelly connected to the high-voltage battery 12 and the inverter IV. The capacitor C serves as, for example, a smoothing element.

The inverter IV serves as, for example, a circuit configured to output an AC (Alternating Current) voltage to be applied to the motor-generator 10. Specifically the inverter IV is designed as a three-phase inverter. The inverter IV is provided with a first pair of series-connected high- and low-side (upper- and lower-arm) switching elements Sup and Sun, a second pair of series-connected high- and low-side (upper- and lower-arm) switching elements Svp and Svn, and a third pair of series-connected high- and low-side (upper- and lower-arm) switching elements Swp and Swn. The inverter IV is also provided with flywheel diodes Dup, Dun, Dvp, Dvn, Dwp, and Dwn electrically connected in antiparallel to the switching elements Sup, Sun, Svp, Svn, Swp, and Swn, respectively.

In the first embodiment, as the switching elements Sup, Sun, Svp, Svn, Swp, and Swn, IGBTs are respectively used.

When power MOSFETs are used as the switching elements Sup, Sun, Svp, Svn, Swp, and Swn, intrinsic diodes of the power MOSFETs can be used as the flywheel diodes, thus eliminating the flywheel diodes.

The first to third pairs of switching elements are parallelly connected to each other in bridge configuration.

A connecting point through which the switching elements Sup and Sun of the first pair are connected to each other in series is connected to an output lead extending from the separate terminal of the U-phase winding. Similarly, a connecting point through which the switching elements Svp and Svn of the second pair are connected to each other in series is connected to an output lead extending from the separate end of the V-phase winding. Moreover, a connecting point through which the switching elements Swp and Swn of the third pair are connected to each other in series is connected to an output lead extending from the separate end of the W-phase winding.

One end of the series-connected switching elements of each of the first, second, and third pairs, such as the drain of the corresponding high-side switching element, is connected to the positive terminal of the battery 12 via a positive terminal of the inverter IV. The other end of the series-connected switching elements of each of the first, second, and third pairs, such as the source of the corresponding low-side switching element, is connected to the negative terminal of the battery 12 via a negative terminal of the inverter IV.

The control system 100 is equipped with, as means for detecting operating conditions of each of the motor-generator 10 and the inverter IV, current sensors 16, 17, and 18, and a voltage sensor 19.

The current sensor 16 is arranged to allow measurement of an instantaneous U-phase alternating current iu actually flowing through the U-phase winding of the stator. Similarly, the current sensor 17 is arranged to allow measurement of an instantaneous V-phase alternating current iv actually flowing through the V-phase winding of the stator. The current sensor 18 is arranged to allow measurement of an instantaneous W-phase alternating current iw actually flowing through the W-phase winding of the stator.

The current sensors 16, 17, and 18 are communicable with the control apparatus 14 through the interface 13.

Specifically, each of the current sensors 16, 17, and 18 is operative to send, to the control apparatus 14, the instantaneous value of a corresponding one of the U-, V-, and W-phase alternating currents as some of the motor-generator state variables.

The voltage sensor 19 is arranged to allow measurement of an input voltage (power supply voltage) VDC to be applied to the inverter IV. The voltage sensor 19 is communicable with the control apparatus 14 through the interface 13, and operative to send, to the control apparatus 14, the inverter input voltage VDC to be applied to the inverter IV as one of the motor-generator state variables.

The measured values of the sensors 16 to 19 are captured, via the interface 13, by the control apparatus 14. The control apparatus 14 is connected with a request torque input unit 15 for inputting, to the control apparatus 14, a request torque Tr for the motor-generator 10.

Specifically, the control apparatus 14 is designed to generate and output drive signals for driving the converter CV and the inverter IV based on the measured values of the sensors 16 to 19 to thereby adjust an actual torque of the motor-generator 10 to be matched with the request torque Tr.

Drive signals gup and gun to be outputted from the control apparatus 14 are for driving the switching elements Sup and Sun, respectively. Drive signals gyp and gvn to be outputted from the control apparatus 14 are for driving the switching elements Svp and Svn, respectively. Drive signals gwp and gwn to be outputted from the control apparatus 14 are for driving the switching elements Swp and Swn, respectively. Each of the drive signals gup, gun, gyp, gvn, gwp, and gwn is, for example, a pulse signal with a controllable pulse width (a controllable on duration).

The control apparatus 14 is designed as, for example, a computer circuit consisting essentially of, for example, a CPU and a nonvolatile memory, and operates on a voltage lower than the battery voltage. Thus, the control apparatus 14 constitutes a low voltage system, and the motor-generator 10, the inverter IV, the capacitor C, and the high-voltage battery 12 constitute a high voltage system.

Figure 2:
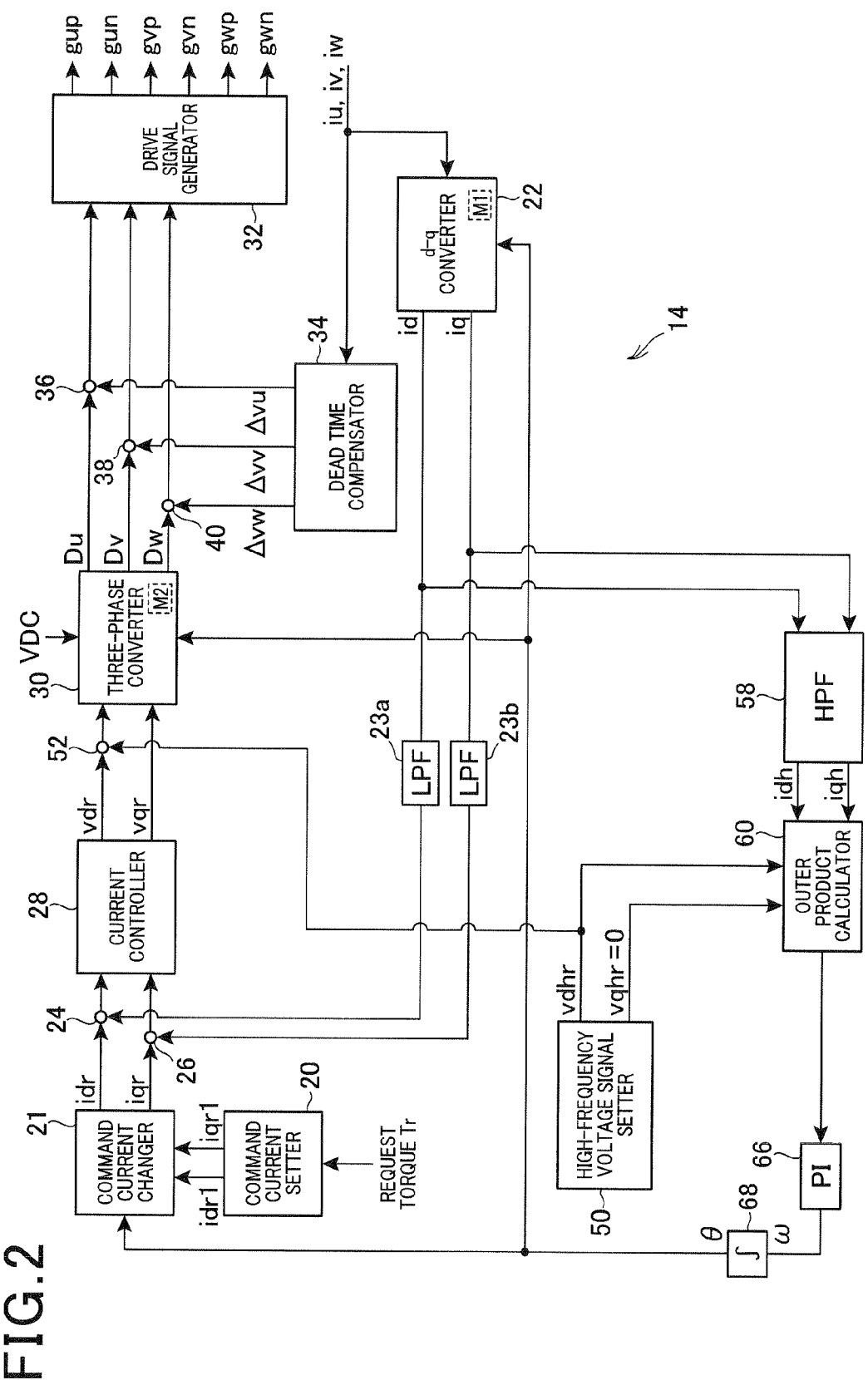
FIG. 2 is a block diagram schematically illustrating functional modules of a control apparatus equivalent to tasks to be executed thereby according to the first embodiment.

FIG. 2 schematically illustrates functional modules of the control apparatus 14 equivalent to tasks to be executed by the control apparatus 14.

As illustrated in FIG. 2, the control apparatus 14 includes a command current setter 20, a command current changer 21, a d-q converter 22, a pair of low-pass filters (LPF) 23a and 23b, deviation calculators 24 and 26, a current controller 28, a three-phase converter 30, a drive signal generator 32, dead time compensator 34, and correctors 36, 38, and 40. The control apparatus 14 also includes a high-frequency signal setter 50, a superimposing unit 52, a high-pass filter 58, an outer product calculator 60, a velocity calculator 66, and an angle calculator 68.

First, some of the modules of the control apparatus 14 for a controlled-variable controlling task will be described hereinafter.

The command current setter 20 is operative to receive the request torque Tr inputted from the request torque input unit 15. The command current setter 20 is also operative to set a command d-axis current component idr1 and a command q-axis current component iqr1 in the d-q coordinate system of the rotor based on the request torque Tr. For example, in the first embodiment, the command d- and q-axis current components idr1 and iqr1 are set to levels required to carry out maximum torque control to achieve maximum torque output with minimum armature current. That is, control of the command d- and q-axis current components idr1 and iqr1 on the "MAXIMUM-TORQUE AND MINIMUM-CURRENT CURVE" in FIG. 8A allows maximum torque output of the motor-generator 10 with minimum armature current.

The d-q converter 22 has, for example, a map M1 in datatable format, in mathematical expression format, and/or program format.

Specifically, the d-q converter 22 is operative to receive actual instantaneous U-, V-, and W-phase alternating currents iu, iv, and iw measured by the respective current sensors 16, 17, and 18 and a rotational angle θ of the motor-generator 10 (the d-axis of the rotor) calculated by a rotational angle calculating task described later. The d-q converter 22 is also operative to convert the received actual instantaneous U-, V-, and W-phase alternating currents iu, iv, and iw in the stator coordinate system into actual d-axis and q-axis current components id and iq in the d-q coordinate system of the rotor based on the calculated rotational angle θ of the motor-generator 10 and the map M1.

The command current changer 21 is operative to change the command d- and q-axis current components idr1 and iqr1 set by the command current setter 20 to a command d-axis current component idr and a command q-axis current component iqr in the d-q coordinate system based on the rotational angle θ of the motor-generator 10.

The deviation calculator 24 is operative to calculate a deviation Δid between the command d-axis current component idr corrected by the command current changer 21 and the actual d-axis current component id; the d-axis current component id has been filtered by the LPF 23a so that high-frequency components have been eliminated therefrom. The deviation calculator 26 is operative to calculate a deviation Δiq between the command q-axis current component iqr corrected by the command current changer 21 and the actual q-axis current component iq; the q-axis current component iq has been filtered by the LPF 23b so that high-frequency components have been eliminated therefrom.

The current controller 28 is operative to calculate, based on the deviation Δid, a command voltage vdr in the d-axis; this command voltage vdr means a feedback manipulated value for d-axis current to allow the command d-axis current component idc to be matched with the measured actual d-axis current component id.

The current controller 28 is also operative to calculate, based on the deviation Δiq, a command voltage vqr in the q-axis; this command voltage vqr means a feedback manipulated value for q-axis current to allow the command q-axis current component iqr to be matched with the measured actual q-axis current component iq.

Specifically, in the first embodiment, the current controller 28 computes each of the command voltages vdr and vqr using a proportional gain term and an integral gain term of a proportional integral feedback algorithm.

In the proportional integral feedback algorithm, each of the command voltages vdr and vqr is expressed based on the proportional gain term and integral gain term.

The proportional gain term for each of the command voltages vdr and vqr contributes to change in a corresponding one of the command voltages vdr and vqr in proportion to a corresponding one of the temporal deviations Δid and Δiq. The integral gain term is proportional to an accumulated offset of instantaneous values of each of the temporal deviations Δid and Δiq over time to reset the accumulated offset (steady-state deviation) over time to zero.

The three-phase converter 30 has, for example, a map M2 in data-table format, in mathematical expression format, and/or program format.

Specifically, the three-phase converter 30 is operative to convert, based on the calculated rotational angle θ and the map M2, the command voltages vdr and vqr in the d and q axes into a U-phase command voltage vur, a V-phase command voltage vvr, and a W-phase command voltage vwr for the respective U-, V-, and W-phase windings of the motor-generator 10. The U-, V-, and W-phase command voltages vur, vvr, and vwr correspond to, for example, substantially pseudo sinusoidal waves, respectively. Note that the command voltage vdr outputted from the current controller 28 is corrected by superimposing a d-axis high-frequency component vdhr described later on the command voltages vdr by the superimposing unit 52, and the corrected command voltages vdr is inputted to the three-phase converter 30 as the command voltage vdr. In this embodiment, the high-frequency voltage signal setter 50 and the superimposing unit 52 serve as a superimposing element.

The three-phase converter 30 is also operative to divide, by the half (½) level of the inverter input voltage VDC, the command voltages vur, vvr, and vwr to thereby generate normalized U-, V-, and W-phase duty signals Du, Dv, and Dw, respectively.

The dead time compensator 34 is operative to calculate dead-time correction values Δvu, vv, and vw for feedforward control of the respective duty signals Du, Dv, and Dw based on the corresponding phase currents iu, iv, and iw. The operations of the dead time compensator 34 will be fully described later.

Each of the correctors 36, 38, and 40 is operative to correct a corresponding one of the duty signals Du, Dv, and Dw based on a corresponding one of the dead-time correction values Δvu, vv, and vw.

The drive signal generator 32 is operative to perform a PWM task based on comparison in magnitude between the corrected duty signals Du, Dv, and Dw and a cyclic triangular carrier CS, thus generating drive signals gup, gun, gyp, gvn, gwp, and gwn. Each of the drive signals gup, gun, gyp, gvn, gwp, and gwn is a pulse signal with a controllable duty cycle (controllable pulse width). As the carrier CS, a cyclic sawtooth carrier can be used.

Figure 3:
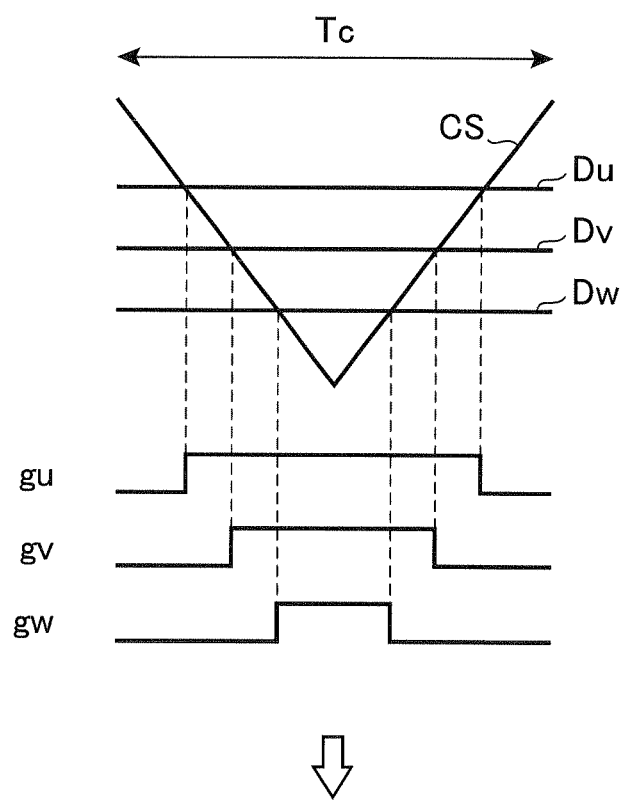
FIG. 3 is a timing chart schematically illustrating a PWM task to be carried out by a drive signal generator illustrated in FIG. 1.
Figure 3:
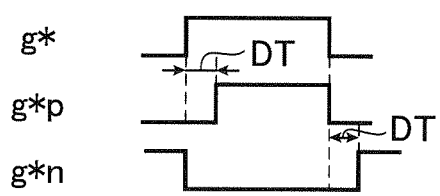

FIG. 3 schematically illustrates in detail the PWM task to be carried out by the drive signal generator 32. Specifically, in FIG. 3, 1 cycle of the triangular carrier CS is illustrated in enlarged form, and the duty signals Du, Dv, and Dw are superimposed on the triangular carrier CS. As described above, the triangular carrier CS is used, which has an amplitude of 1 and a substantially isosceles triangle with the rate and duration of rise being identical to the rate and duration of fall, respectively.

The PWM task is configured to compare in magnitude the triangular carrier CS with the corrected duty signals Du, Dv, and Dw, and to generate the PWM signals (pulses) gu, gv, and gw. That is, each of the PWM signals gu, gv, and gw has an on duty (duty cycle) whose duration is in agreement with the period of a corresponding duty signal lower in amplitude than the triangular carrier CS (see FIG. 3).

The PWM task is also configured to generate, based on the PWM pulses gu, gv, and gw, high-side (upper-arm) drive signals g*p (*=u, v, w) and low-side (lower-arm) drive signals g*n (*=u, v, w). For generation of the high-side drive signals g*p and the low-side drive signals g*n, the PWM task is configured to introduce a time delay (dead time) DT between each of the high-side drive signals g*p and a corresponding one of the low-side drive signals g*n to prevent a short circuit in the DC link.

Specifically, the PWM task is configured to delay the rising edge of each of the high- and low-side drive signals g*# (*=u, v, w, #=p, n) by the dead time DT relative to a corresponding one of the PWM signals gu, gv, and gw (see FIG. 3). As illustrated in FIG. 3, each of the duty signals Du, Dv, and Dw is kept unchanged within 1 cycle of the triangular carrier CS, and therefore, the update cycle Tc of each of the duty signals Du, Dv, and Dw (the command voltages vur, vvr, and vwr) is set to be identical to the cycle of the triangle carrier CS. More specifically, in this embodiment, each of the duty signals Du, Dv, and Dw is set to be updated each time the triangle carrier CS reaches its upper peak.

Figures 4A, 4B:
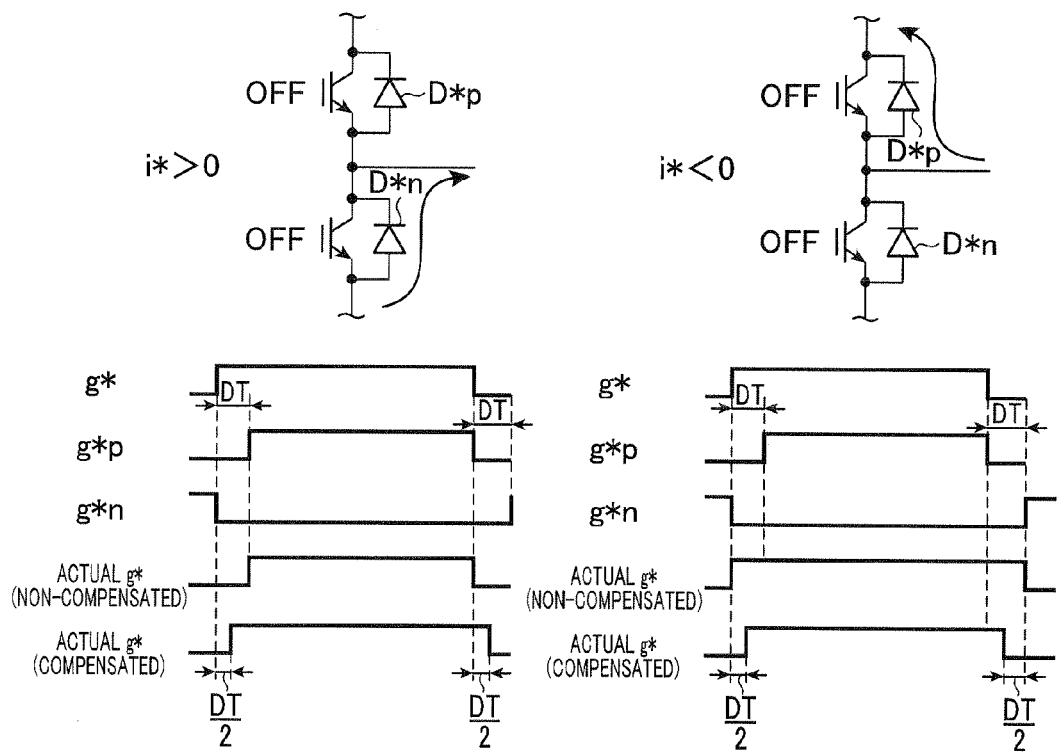
FIG. 4A is a timing chart schematically illustrating a dead time compensating task if a phase current is positive according to the first embodiment.
FIG. 4B is a timing chart schematically illustrating a dead time compensating task if a phase current is negative according to the first embodiment.
Figure 4C:
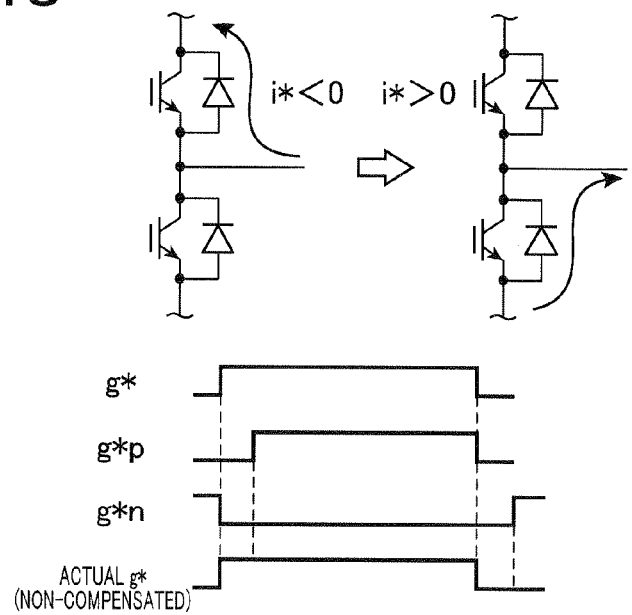
FIG. 4C is a timing chart schematically illustrating a dead time compensating task if a phase current is reversed in polarity from negative to positive according to the first embodiment.

FIGS. 4A to 4C schematically illustrate in detail the operations of the dead time compensator 34.

In FIGS. 4A to 4C, a pair of upper- and lower-arm switching elements with a pair of upper- and lower-arm diodes for one phase winding is illustrated as an example.

When a phase current i* (*=u, v, or w) is positive during a dead time DT (see FIG. 4A), a current flows through a corresponding lower-arm diode D*n to continuously cause the positive phase current i* to flow during the dead time DT. For this reason, the on duration of a drive signal g*p for a corresponding upper-arm switching element is shorter than the on duration of the corresponding PWM signal g* by the dead time DT. In addition, the rising edge of the corresponding drive signal g*p is delayed by the dead time DT relative to the rising edge of the corresponding PWM signal g*.

In this case, the dead time compensator 34 corrects the corresponding duty signal D* by adding the dead-time correction value Δv* thereto, thus delaying each of the rising edge and falling edge of the corresponding PWM signal g* by the half of the dead time DT (DT/2). This results in agreement between the on duration of the drive signal g*p and that of the corresponding PWM signal g* before correction. This also results in reduction in half of the delay of the riding edge of the drive signal g*p.

Next, when a phase current i* (*=u, v, or w) is negative during a dead time DT (see FIG. 4B), a current flows through a corresponding upper-arm diode D*p to continuously cause the negative phase current i* to flow during the dead time DT. For this reason, the on duration of a drive signal g*p for a corresponding upper-arm switching element is longer than the on duration of the corresponding PWM signal g* by the dead time DT.

In this case, the dead time compensator 34 corrects the corresponding duty signal D* by subtracting the dead-time correction value Δv* therefrom, thus correcting each of the rising edge and falling edge of the corresponding PWM signal g* by the half of the dead time DT (DT/2). This results in agreement between the on duration of the drive signal g*p and the on duration of the corresponding PWM signal g* before correction. Note that the rising edge of the drive signal g*p is delayed relative to that of the corresponding PWM signal g* before correction by the half of the dead time DT (DT/2).

Furthermore, it is assumed that a phase current i* (*=u, v, or w) is reversed from negative to positive during the on duration of the corresponding PWM signal from its rising edge to its falling edge (see FIG. 4C). In this assumption, a current flows through the upper-arm diode D*p during a dead time DT corresponding to the rising edge, and a current flows through the lower-arm diode D* during a dead time DT corresponding to the falling edge. For this reason, the on duration of a drive signal g*p for the upper-arm switching element is in agreement with the on duration of the corresponding PWM signal g*. Thus, in this case, the dead time compensator 34 sets the dead-time correction value Δv* to zero, in other words, the dead time compensator 34 does not correct the drive signal g*p.

The high-frequency signal setter 50 is operative to set a high-frequency command voltage signal Vhr consisting of a d-axis high-frequency component vdhr and a q-axis high-frequency component vqhr. In this embodiment, the q-axis high-frequency component vqhr is zero, and the d-axis high-frequency component vdhr is set such that its polarity is reversed every half cycle of the PWM task. The high-frequency command voltage signal Vhr has a frequency higher than an electric angular frequency of the motor-generator 10.

The high-pass filter 58 is operative to extract high-frequency components idh, iqh from the respective actual d-axis and q-axis current components id and iq. Note that the high-frequency components idh and iqh are components higher than the fundamental components of the actual d-axis and q-axis current components id and iq. Particularly, in this embodiment, frequency components that are the same as the high-frequency command voltage signal Vhr are extracted by the high-pass filter 58. As the high-pass filter 58, means for outputting components having the frequencies corresponding to the half cycle of the PWM signals for the actual d-axis and q-axis current components id and iq can be used.

The outer product calculator 60 is operative to calculate an outer product between the high-frequency command voltage signal Vhr (the d-axis high-frequency component vdhr and the q-axis high-frequency component vqhr) and the high-frequency components idh and iqh. The outer product serves as a parameter having a correlation with an angle formed by the vector of the high-frequency command voltage signal Vhr and the vector of the high-frequency components idh and iqh. That is, the outer product has a correlation with the rotational angle of the rotor (motor-generator 10).

Specifically, because of the salient structure of the rotor of the motor-generator 10, the motor-generator 10 has the inductance Ld smaller than the inductance Lq in the q-axis direction. This allows current to flow easier in the d-axis of the motor-generator 10 than that flowing in the q-axis thereof. For this reason, a high-frequency signal actually flowing (propagating) in the motor-generator 10 based on the superimposed high-frequency command voltage signal Vhr is biased toward the d-axis.

These characteristics of the high-frequency command voltage signal Vhr superimposed on the d-axis command voltage vdr allow the rotational angle θ of the motor-generator 10 to be reliably estimated. These characteristics have been described in U.S. Pat. No. 7,932,692 assigned to the same assignee as that of this application, and therefore, disclosures of which are incorporated herein by reference.

That is, in this embodiment, the outer product is an error-correlated parameter having a correlation with an error of the rotational angle θ of the motor-generator 10. The outer product as the error-correlated parameter is inputted to the velocity calculator 66.

The velocity calculator 66 is operative to compute an electrical angular velocity ω as the sum of a proportional gain term and an integral gain term of a proportional integral feedback algorithm using the outer product as its input.

In the proportional integral feedback algorithm, the angular velocity ω is expressed based on the proportional gain term and integral gain term.

The proportional gain term for the angular velocity ω contributes to change in the angular velocity ω in proportion to the temporal deviations of the angular velocity ω from a target angular velocity corresponding to the rotational angle θ of zero. The integral gain term is proportional to an accumulated offset of instantaneous values of the angular velocity ω over time to reset the accumulated offset (steady-state deviation) over time to zero.

The angle calculator 68 is operative to calculate the rotational angle θ of the motor-generator 10 as an integrated value of the angular velocity ω over time. Thus, the calculated rotational angle θ is a manipulated variable for feedback control of the outer product to its target value of zero. That is, the outer product serves as a parameter associated with the difference in phase between the high-frequency voltage signal Vhr and a high-frequency current signal (idh, iqh) actually flowing in the motor-generator 10. Making the outer product become zero allows the high-frequency command voltage signal Vhr to be superimposed on a direction in which the inductance is minimum, such as the real d-axis direction. In the first embodiment, the outer product calculator 60, the velocity calculator 66, and the angle calculator 68 serve as a calculating element.

That is, as described above, when the high-frequency command voltage signal Vhr is superimposed on the command voltage vdr in the d-axis for controlling a controlled variable of the motor-generator 10 as the output voltage of the inverter IV, the vector of the high-frequency components idh and igh is directed to the d-axis direction. This results in that the outer product becomes zero. If the outer product is not zero, the calculated rotational angle θ is manipulated to make the outer product become zero, thus matching the calculated rotational angle θ with an actual rotational angle of the motor-generator 10.

Lets us assume the control system 100 without including the dead time compensator 34, and the magnitude of the high-frequency command voltage signal Vhr superimposed on the command voltage vdr in the d-axis is reduced with reduction in the ratio, to dead time DT, of the variation in the on duration or off duration of the corresponding drive signal g*#. In this assumption, an error contained in a high-frequency voltage signal to be actually superimposed due to the dead time DT may become larger. This is a factor that reduces the accuracy of estimating the rotational angle θ of the motor-generator 10.

However, in the control system 100 according to the first embodiment, the dead time compensator 34 prevents the reduction in the accuracy of estimating the rotational angle θ in either the first case where a phase current i* is positive during a dead time DT (see FIG. 4A) or the second case where a phase current i* is negative during a dead time DT (see FIG. 4B) except for the third case where a phase current i* is reversed during the on duration of the drive signal g* from its rising edge to its falling edge.

The reasons for the prevention of the reduction in the accuracy of estimating the rotational angle θ in each of the first and second cases are as follows. Specifically, as illustrated in FIGS. 4A and 4B, the on duration of each of the drive signals gup, gun, gyp, gvn, gwp, and gwn is defined by a corresponding one of the PWM signals gu, gv, and gw by the correction of the dead time compensator 34. Similarly, each of the drive signals gup, gun, gyp, gvn, gwp, and gwn is delayed in phase by the half of dead time DT (i.e. by DT/2) relative to a corresponding one of the PWM signals gu, gv, and gw.

For these reasons, a line voltage based on a corrected PWM signal g* is in agreement with that defined based on a PWM signal g* before correction. That is, the PWM task with each of the drive signals gup, gun, gyp, gvn, gwp, and gwn being delayed in phase by the DT/2 is equivalent to the PWM task with the carrier CS being delayed in phase by the DT/2, and therefore, the corresponding line voltage has no errors.

However, when a phase current i* (*=u, v, or w) is reversed from negative to positive during the on duration of the drive signal g* from its rising edge to its falling edge in microscopic view, the drive signal g*n corresponding to the phase (u, v, or w) of the reversed current i* is identical in phase to a corresponding PWM signal gu, gv, or gw. For this reason, the drive signal g*n corresponding to the phase (u, v, or w) of the reversed current i* advances by the half of dead time DT (DT/2) relative to the drive signals g*n corresponding to the other phases. Thus, a corresponding line voltage is delayed relative to that defined based on a PWM signal g* before correction, resulting in an error in the high-frequency command voltage signal Vhr.

Figure 5:
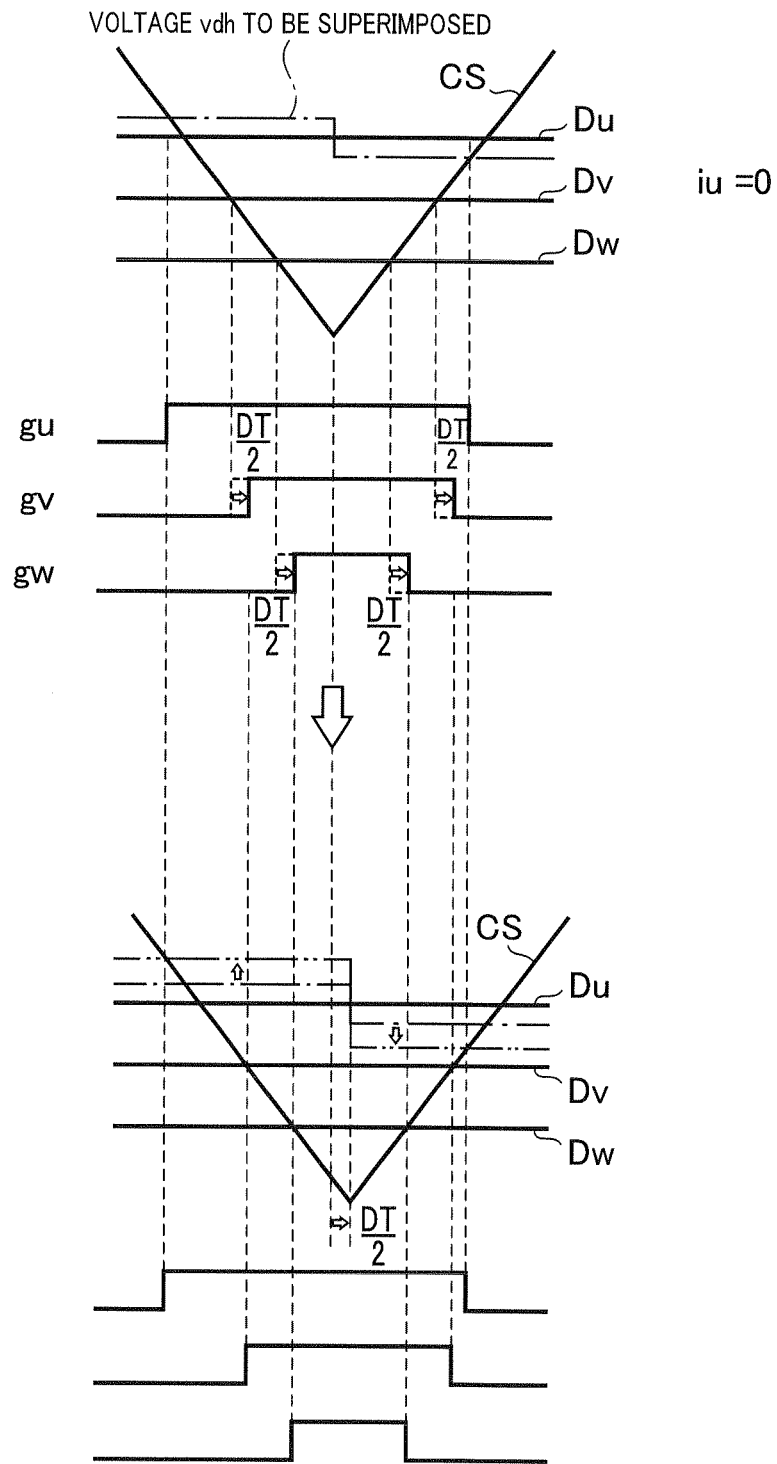
FIG. 5 is a timing chart schematically illustrating an error arising in a high-frequency voltage signal according to the first embodiment.

FIG. 5 schematically illustrates an example of PWM signals g* corrected by the dead time compensator 34. In FIG. 5, the PWM signal gu corresponds to a zero crossing period in which a corresponding phase current crosses through zero level, that is, reversed in polarity, so that a U-phase voltage leads in phase by half of dead time DT. In other words, in execution of the PWM task with the carrier CS retarding in phase by the half of the dead time DT, the U-phase voltage leads in phase by only the half of the dead time DT. Thus, if positive and negative parts of a high voltage signal vdh are successively superimposed on the duty signal Du within the respective first and second halves of the PWM cycle (see the dashed-dot line in FIG. 5), the amplitude of a high-frequency voltage signal to be actually superimposed is increased (see the two-dot chain line in FIG. 5).

Figure 6:
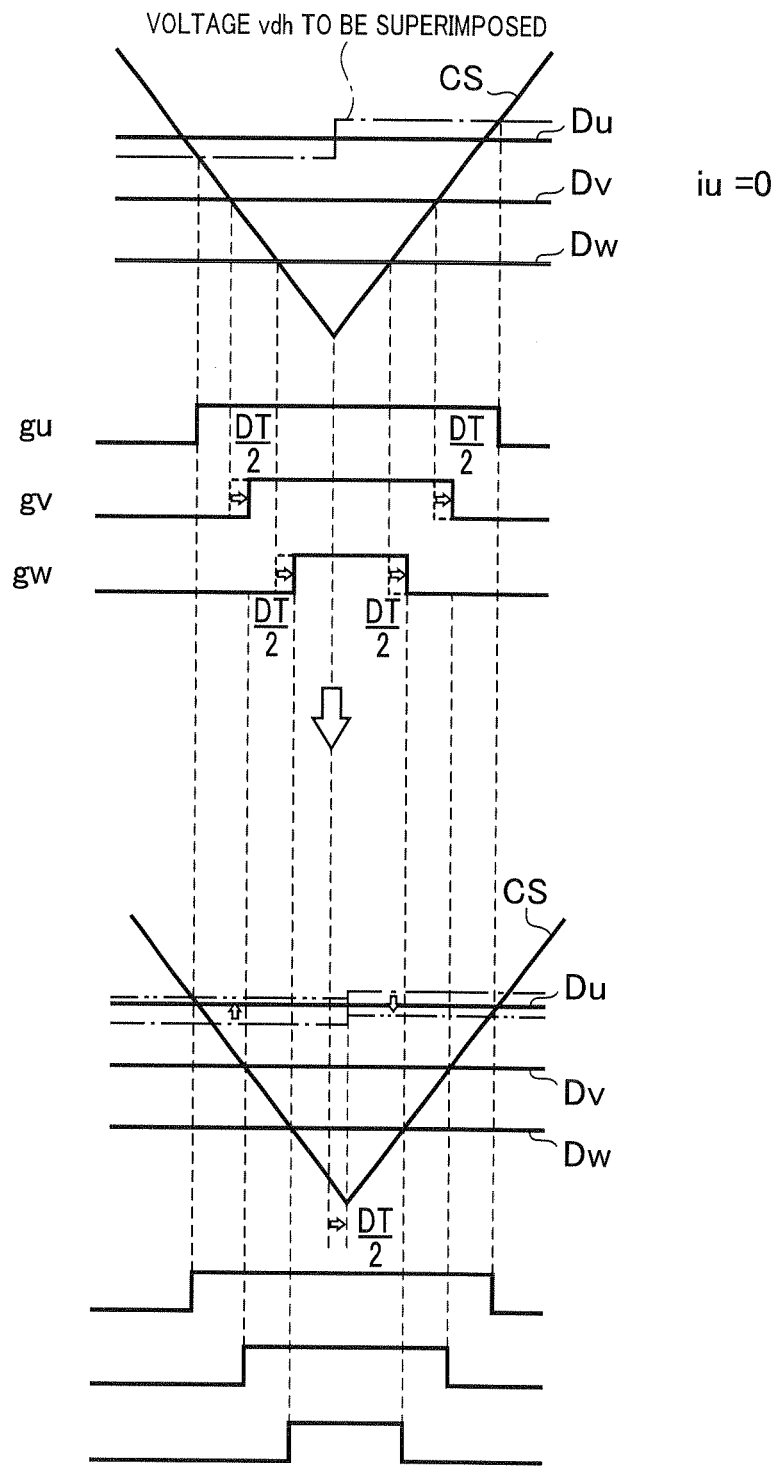
FIG. 6 is a timing chart schematically illustrating an error arising in a high-frequency voltage signal to be actually superimposed.

In contrast, if negative and positive parts of a high voltage signal vdh are successively superimposed on the duty signal Du within the respective first and second halves of the PWM cycle, the amplitude of a high frequency voltage signal to be actually superimposed is reduced. At worst, as illustrated by two-dot chain line in FIG. 6, the polarity of the high voltage signal is reversed. Note that the high voltage signal vdh illustrated by the dashed-dot line in FIGS. 5 and 6 is actually obtained by normalizing the d-axis high-frequency component vdhr of the high-frequency command voltage signal Vhr.

Note that a zero crossing period means a period during which the absolute level of a current flowing in the motor-generator 10, such as a phase current i* (*=u, v, or w), is equal to or lower than a preset threshold level, so that a phase current i* crosses through zero level during the corresponding zero crossing period.

Figure 7:
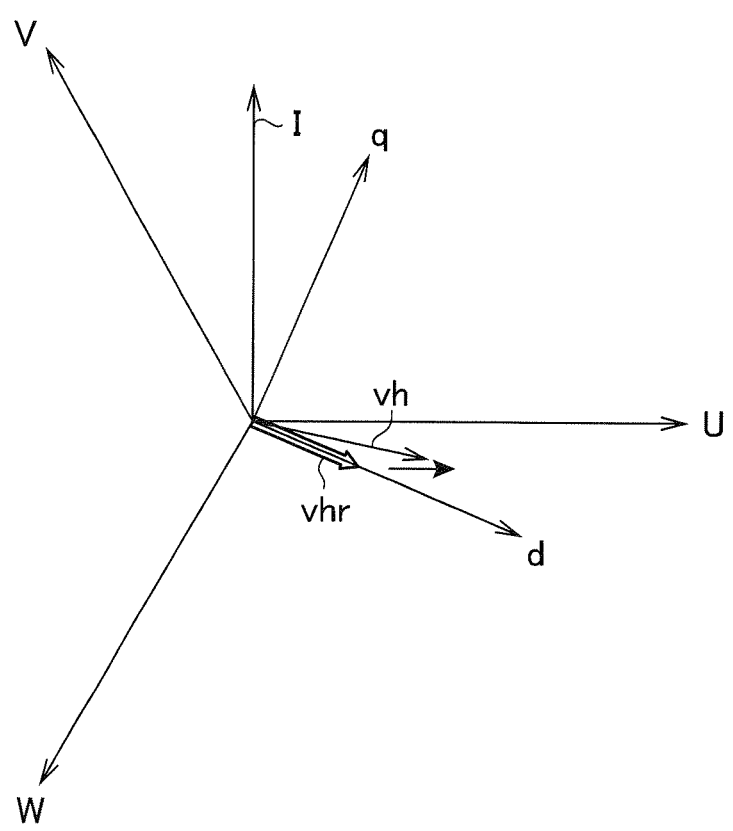
FIG. 7 is a vector diagram schematically illustrating an example of an error between a high-frequency voltage signal to be actually superimposed and a high-frequency command voltage signal according to the first embodiment.

For this reason, as illustrated in FIG. 7, if a phase current crosses through zero level, a high-frequency voltage signal Vh to be actually superimposed has an error relative to the high-frequency command voltage signal Vhr.

Thus, the control apparatus 14 according to the first embodiment is configured to manipulate the phase of a current vector for controlling a controlled variable, such as actual torque, of the motor-generator 10 in order to reduce zero crossing periods.

Figure 8A:
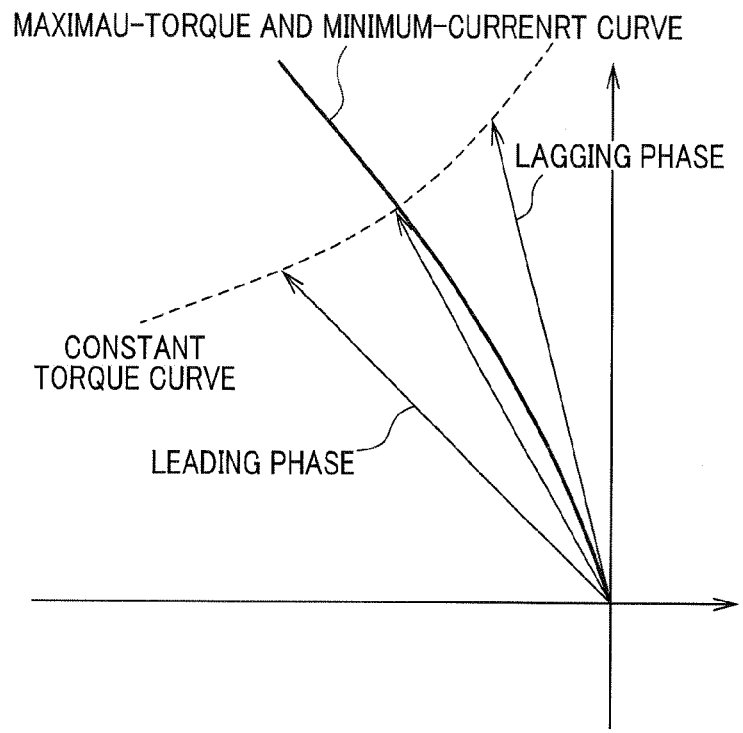
FIG. 8A is a graph schematically illustrating a maximum-torque and minimum-current curve for control of a motor-vehicle according to the first embodiment.

Specifically, as illustrated in FIG. 8A, the control apparatus 14 manipulates the phase of the vector of current flowing in the motor-generator 10 for controlling the actual torque of the motor-generator 10 by shifting it in the phase-leading direction or phase-lag direction with the value of the current vector varying on a constant torque curve. In other words, the control apparatus 14 manipulates the phase of the vector of current flowing in the motor-generator 10 to maintain the actual torque of the motor 10 before and after the shift of the phase in the phase-leading direction or phase-lag direction.

Figure 8B:
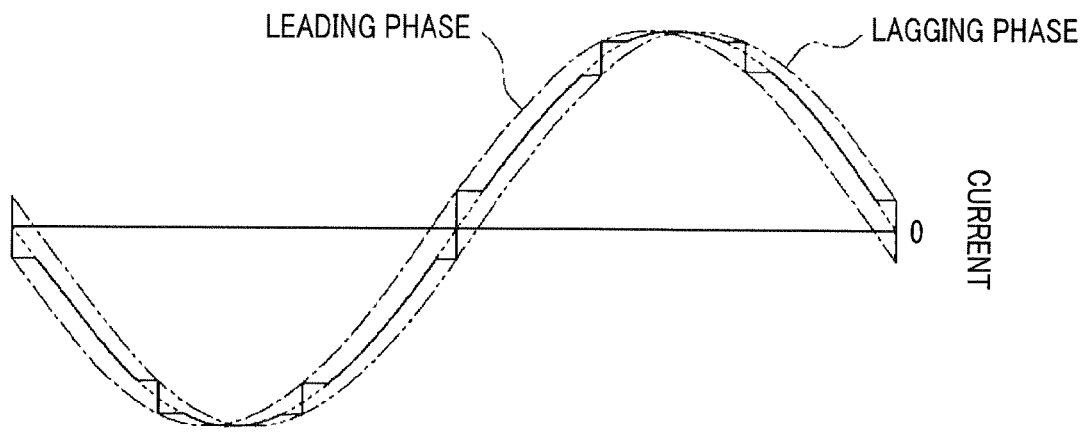
FIG. 8B is a graph schematically illustrating an example of how to manipulate a current vector for controlling a controlled variable of the motor-generator according to the first embodiment.

This manipulation reduces zero crossing periods while preventing the reduction in the controllability of the controlled variable (actual torque) of the motor-generator 10 (see FIG. 8B). That is, as illustrated in FIG. 8B, at a zero crossing point through which a phase current crosses through zero level, the gradient of the tangential line of the phase current increases to, for example, approach infinity, so that the zero crossing period is greatly reduced, that is, minimized.

Figure 9:
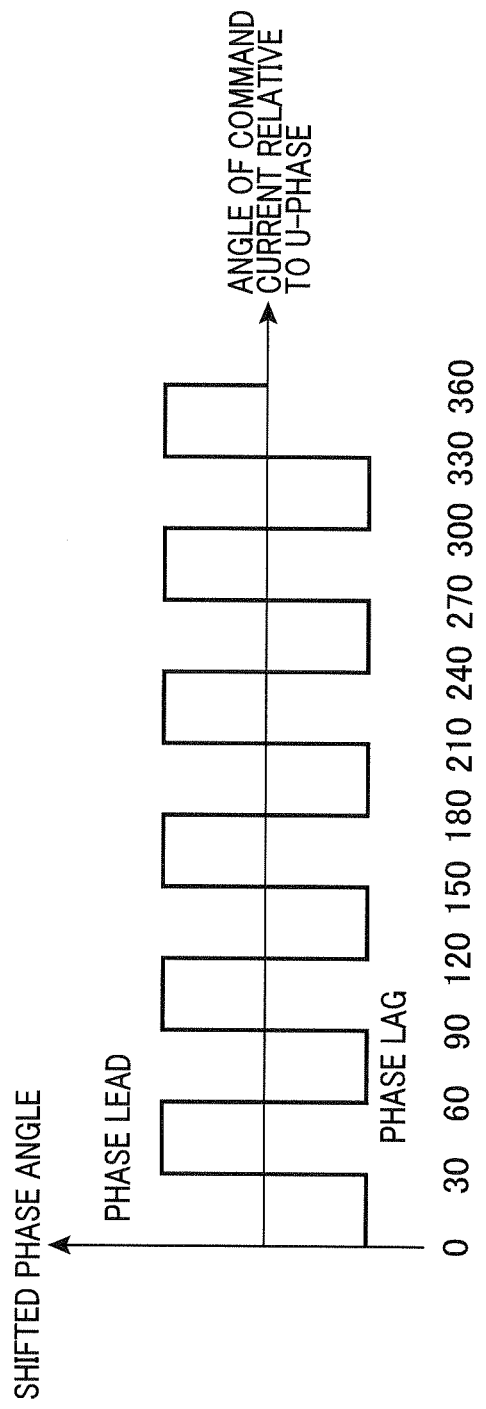
FIG. 9 is a view schematically illustrating how to manipulate the phase of the current vector according to the first embodiment.

For example, in the first embodiment, the control apparatus 14 shifts, by a preset phase angle, the phase of a command current vector I1 consisting of the command d- and q-axis current components idr1 and iqr1 alternately in the phase-leading direction and phase-lag direction every time the direction of the command current vector I1 turns by 30 electrical degrees (see the graph illustrated in FIG. 9). Note that, in the graph illustrated in FIG. 9, the vertical axis represents the shifted phase angle, and the horizontal axis represents the rotational angle (electrical degrees) of the motor-generator 10 relative to the direction of the U-phase of the stator.

More specifically, the command current changer 21 is operative to shift, by the preset phase angle, the phase of the command current vector I1 (idr1, iqr1) alternately in the phase-leading direction and phase-lag direction every time it detects, based on the rotational angle θ of the motor-generator 10 inputted thereto, that the direction of the command current vector I1 turns by, for example, 30 electrical degrees. For example, the command current changer 21 changes the command d- and q-axis current components idr1 and iqr1 to shift, by the preset phase angle, the phase of the command current vector I1 (idr1, iqr1) alternately in the phase-leading direction and phase-lag direction.

An example of methods to manipulate the phase of current I flowing in the motor-generator 10 in a power-running mode of the motor vehicle according to the first embodiment will be described hereinafter with reference to FIGS. 10A and 10B.

Figure 10A:
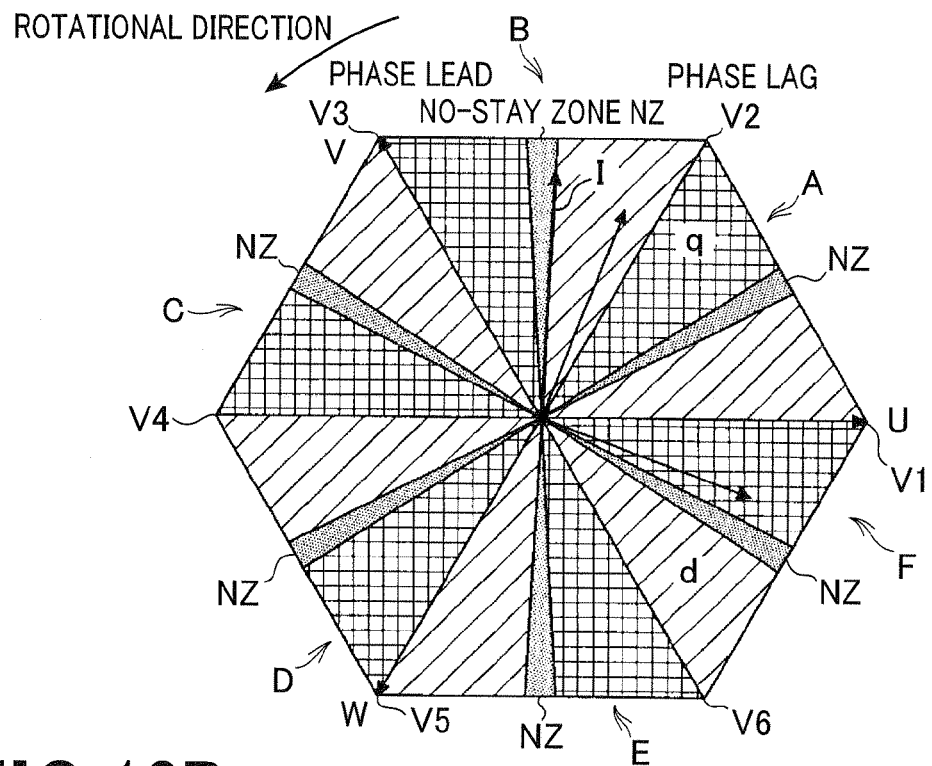
FIG. 10A is a vector diagram schematically illustrating how to manipulate the phase of a current vector in power running mode according to the first embodiment.
Figure 10B:
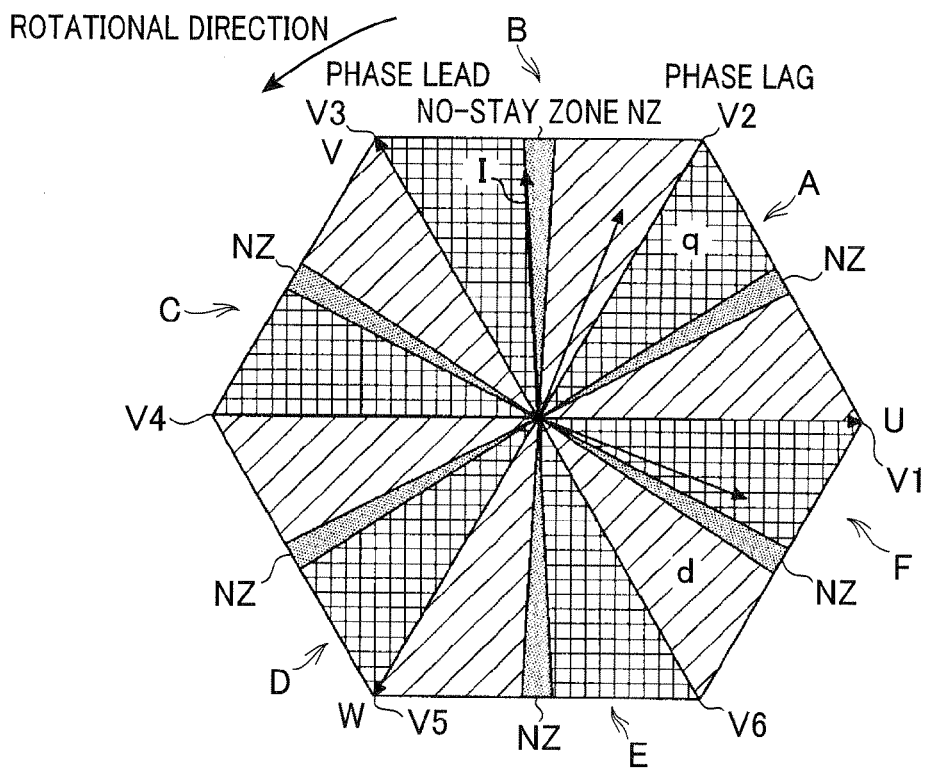
FIG. 10B is a vector diagram schematically illustrating how to manipulate the phase of the current vector in power running mode of a motor-vehicle according to the first embodiment.

FIG. 10A schematically illustrates six areas A to F partitioned by six voltage space vectors V1 to V6 defined in the stator of the motor-generator 10 by on-off states (modes) of the switching elements of the inverter IV. FIG. 10A also schematically illustrates the current vector I on, for example, the area B; the current vector I is about to be orthogonal to the U-phase axis of the stationary coordinate system. If the current vector I based on the command current vector I1 (idr1, iqr1) were not shifted in phase by the command current changer 21, a zero crossing period in which a corresponding positive U-phase current vector crosses through zero level would be long. Note that reference character NZ in each area represents a no-stay zone. That is, if the positive U-phase current vector is located in the zero crossing period, the corresponding current vector I is located in the no-stay zone NZ in the area B. Similarly, if each of the positive V- and W-phase current vectors is located in the zero crossing period, the corresponding current vector I is located in the no-stay zone NZ in a corresponding one of the areas D and F. In addition, if each of the negative U-, V- and W-phase current vectors is located in the zero crossing period, the corresponding current vector I is located in the no-stay zone NZ in a corresponding one of the areas E, A, and C.

Thus, in the first embodiment, the command current changer 21 shifts the phase of the command current vector I1 (idr1, iqr1) in phase-leading direction to shift the corresponding current vector I in phase-leading direction immediately before the current vector I enters the no-stay zone NZ based on rotation of the motor-generator 10. This immediately passes the current vector I through the no-stay zone NZ (see FIG. 10B). Note that, in FIGS. 10A and 10B, the direction of rotation of the motor-generator 10, which corresponds to forward rotation, is illustrated by the arrows in FIGS. 10A and 10B).

Thereafter, the command current changer 21 shifts the phase of the command current vector I1 (idr1, iqr1) in the phase-lag direction to shift the corresponding current vector I in the phase-lag direction based on rotation of the direction of the current vector I. This phase shifting in phase-lag direction prevents the current vector I, whose phase will be shifted in the phase-leading direction in order to immediately pass the current vector I through the next no-stay zone NZ in the area C, from being deviated from the command current vector I1 (idr1, iqr1). Note that each of the no-stay zones NZ is preferably set to include a region in which the absolute level of a corresponding phase current, which is about to enter a corresponding zero crossing period, is lower than an absolute level of ripple current generated by shifting the switching state of the inverter IV in microscopic view. In other words, the preset threshold level of a zero crossing period is set to be equal to or higher than the absolute level of the ripple current.

Particularly, each of the no-stay zones NZ is preferably set to be as narrow as possible. Note that, in the power running mode, the phase-leading direction corresponds to the rotational direction of the motor-generator 10, and the phase-lag direction corresponds to the opposite direction of the rotational direction of the motor-generator 10.

To sum up, the control apparatus 14 shifts the current vector I in phase by a predetermined amount in the rotational direction of the motor-generator 10 prior to the zero crossing period, and thereafter re-shifts it in phase by a predetermined quantity (angle) in the opposite direction of the rotational direction. This reduces a corresponding zero crossing period while reducing the deviation of the current vector I from the command current vector I1.

Figure 11A:
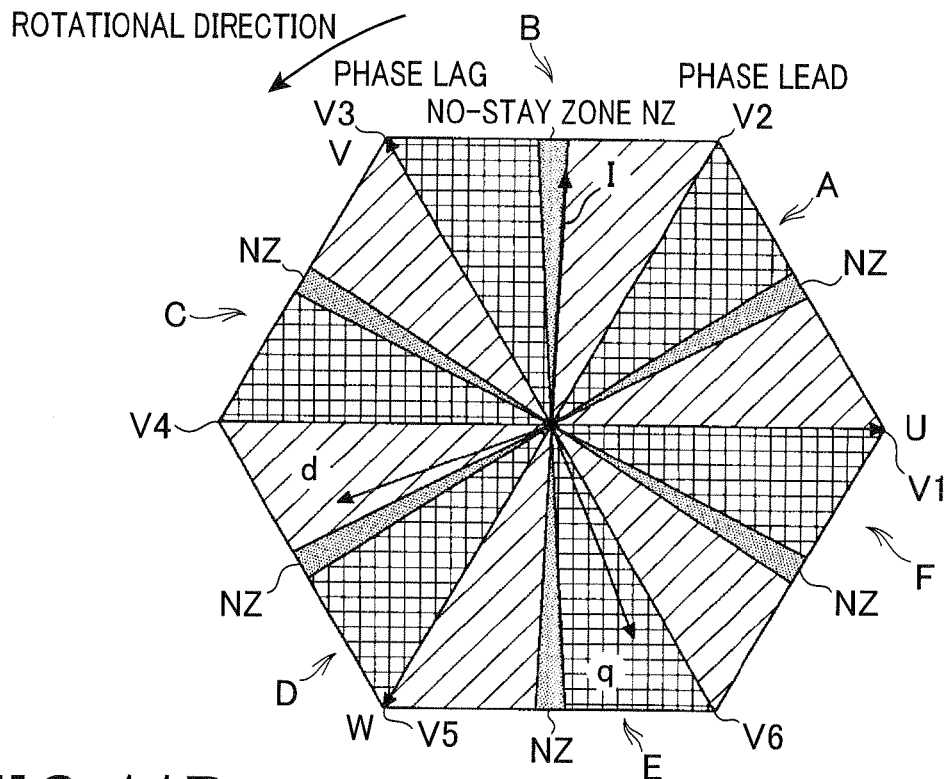
FIG. 11A is a vector diagram schematically illustrating how to manipulate the phase of a current vector in regenerative mode of a motor-vehicle according to the first embodiment.
Figure 11B:
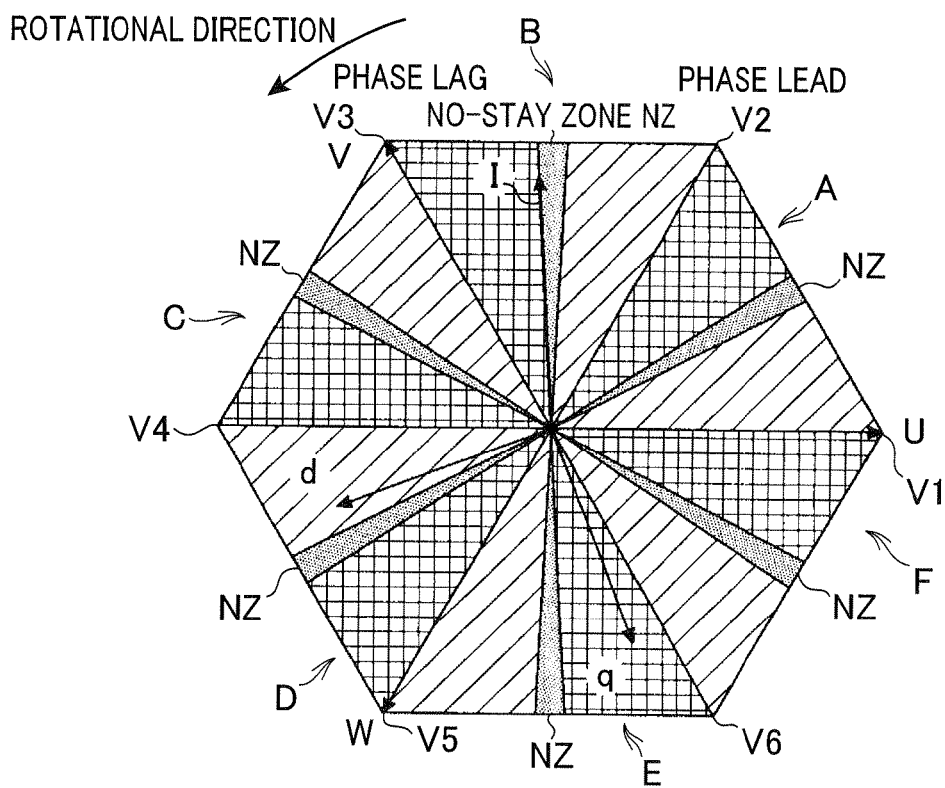
FIG. 11B is a vector diagram schematically illustrating how to manipulate the phase of a current vector in regenerative mode of a motor-vehicle according to the first embodiment.

The method to manipulate the phase of the current vector I in the power-running mode of the motor vehicle can be applied to regenerative mode of the motor vehicle. Note that, in FIGS. 10A and 10B, the phase-leading direction corresponds to the rotational direction of the motor-generator 10, that is, the rotational direction of the d-q coordinate system. However, as illustrated in FIGS. 11A and 11B, if the phase-leading direction is defined as the direction opposite to the phase-lead direction illustrated in FIGS. 10A and 10B, that is, the phase lead direction is opposite to the rotational direction (see FIGS. 11A and 11B), the phase-leading direction and phase-lag direction in the descriptions of the method to manipulate the phase of the current vector I are reversed to each other.

Technical effects achieved by shifting the phase of the current vector I according to the first embodiment will be described hereinafter with reference to FIGS. 12A and 12B.

Figure 12A:
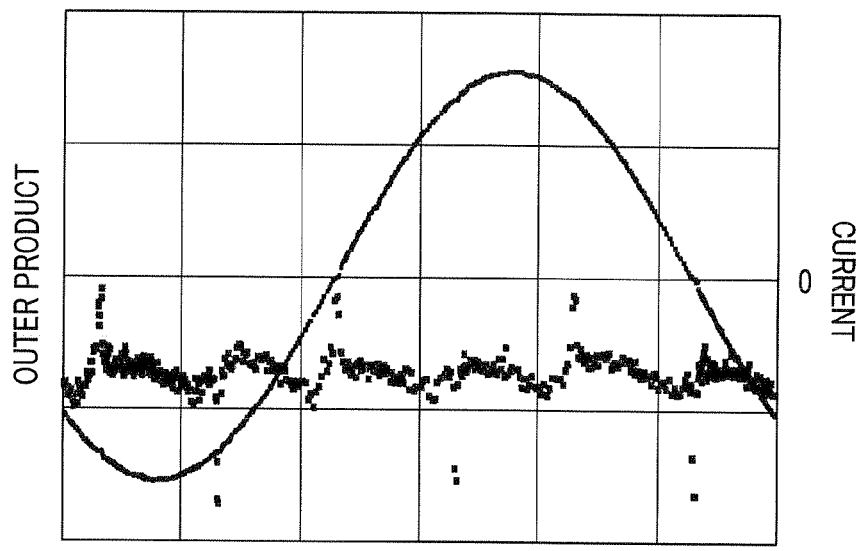
FIG. 12A is a graph schematically illustrating, as a comparison example, a phase current and corresponding plotted values of an outer product between the high-frequency command voltage signal and high-frequency components with given angular errors included in the rotational angle of the motor-generator without using the phase manipulation according to the first embodiment.

FIG. 12A shows, as a comparison example, a phase current and corresponding plotted values of the outer product between the high-frequency command voltage signal Vhr and the high-frequency components idh and iqh with given angular errors included in the rotational angle θ of the motor-generator 10 without using the phase manipulation according to the first embodiment.

Figure 12B:
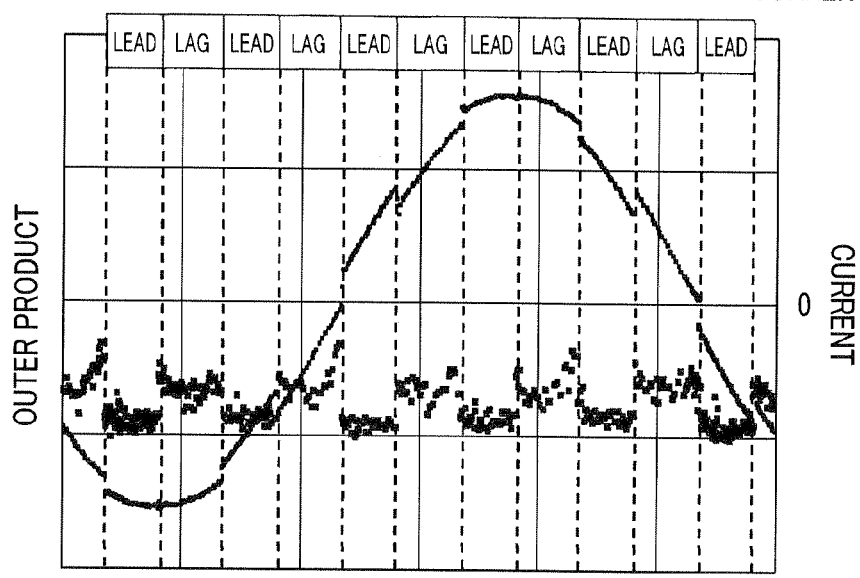
FIG. 12B is a graph schematically illustrating a phase current and corresponding plotted values of the outer product between the high-frequency command voltage signal and the high-frequency components according to the first embodiment.

In contrast, FIG. 12B shows a phase current and corresponding plotted values of the outer product between the high-frequency command voltage signal Vhr and the high-frequency components idh and iqh with given angular errors included in the rotational angle θ of the motor-generator 10 based on the phase manipulation according to the first embodiment. Note that, as described above, in each of the experiment results illustrated in FIGS. 12A and 12B, the values of the outer product were obtained without the aforementioned feedback control of the outer product to zero.

FIGS. 12A and 12B clearly show that the variations in the outer product during and around zero crossing periods of the phase current according to the first embodiment are reduced in comparison to the variations in the outer product during and around zero crossing periods of the phase current according to the comparison example. This is because the control apparatus 14 according to the first embodiment is configured to reduce the zero crossing periods.

Note that the control apparatus 14 is configured to disable the calculating task of the rotational angle θ during a preset period (calculation disabling period) from the shift of the phase of a corresponding current vector I.

Figure 13:
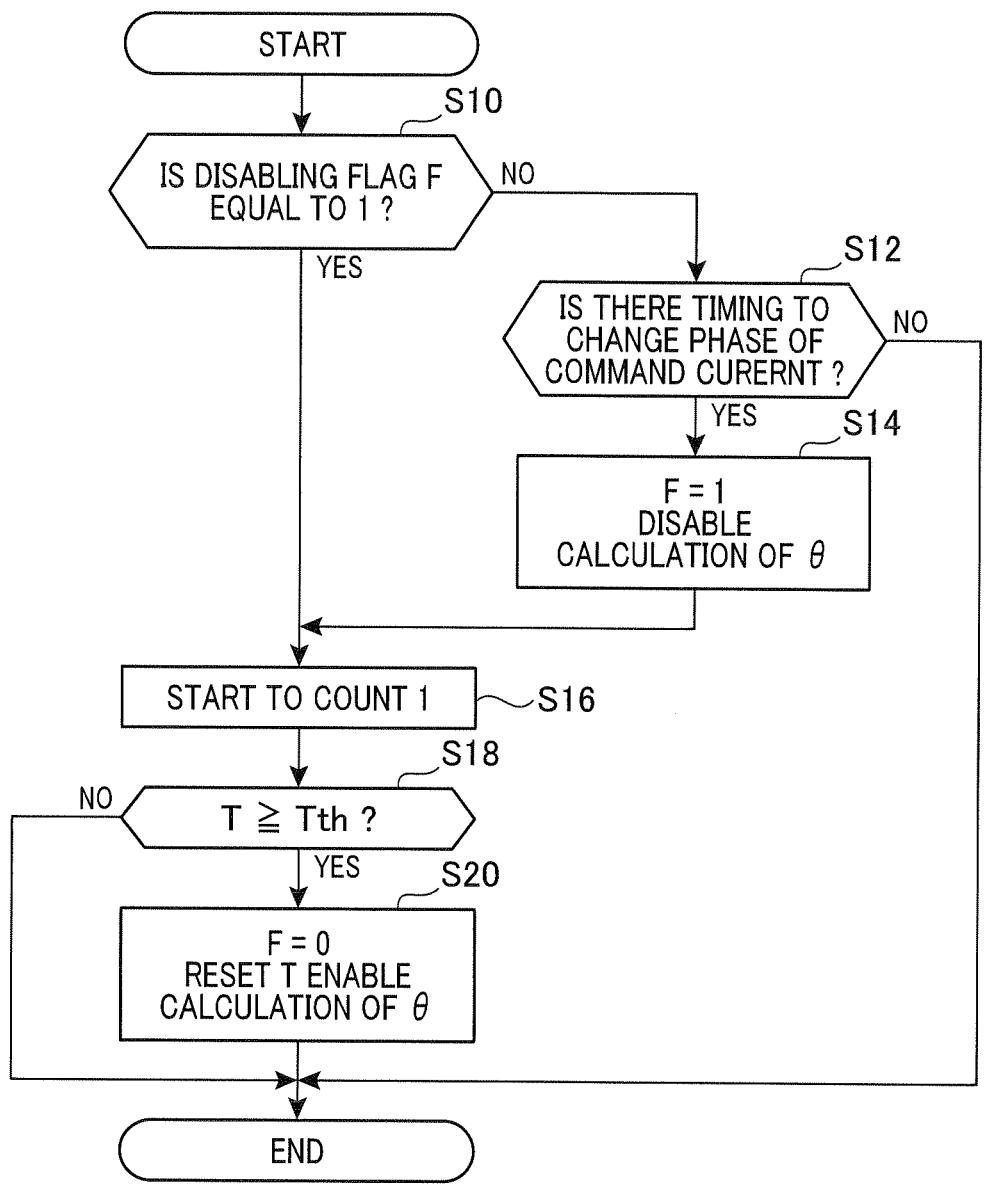
FIG. 13 is a flowchart schematically illustrating a task of disabling calculation of the rotational angle of the motor-generator according to the first embodiment of the present disclosure.

FIG. 13 is a flowchart schematically illustrating the task of disabling calculation of the rotational angle θ of the motor-generator 10 according to the first embodiment; the task is to be repeatedly executed by the control apparatus 14 every preset cycle as an example.

In step S10, the control apparatus 14 determines whether a calculation disabling flag F is set to 1. The calculation disabling flag F is one bit data of 0 or 1, and initially set to 0 each time the control apparatus 14 is powered. When determining that the calculation disabling flag is set to 0 (NO in step S10), the control apparatus 14 determines whether there is timing to shift the phase of the command current vector I1 based on, for example, the actual instantaneous U-, V-, and W-phase alternating currents iu, iv, and iw in step S12. The operation in step S12 is to determine the start point of a period for disabling calculation of the rotational angle θ of the motor-generator 10. Specifically, for example, when the absolute level of a phase current $i^*$ ($*$=u, v, or w) is equal to the preset threshold level so that the phase of the command current vector I1 is shifted at that time, the control apparatus 14 determines that there is timing to shift the phase of the command current vector I1.

When determining that there is timing to shift the phase of the command current vector I1 (YES in step S12), the control apparatus 14 proceeds to step S14. Then, the control apparatus 14 sets the calculation disabling flag F to 1, and disables calculation of the rotational angle θ of the motor-generator 10 in step S14.

When determining that the calculation disabling flag is set to 1 (YES in step S10), or that the operation in step S14 is completed, the control apparatus 14 proceeds to step S16. In step S16, the control apparatus 14 starts to measure time as the calculation disabling period. In the first embodiment, for example, in step S16, the control apparatus 14 sets a hardware or software timer T incorporated therein to count up. Subsequently, the control apparatus 14 determines whether the counted value of the timer T is equal to or higher than a preset threshold Tth in step S18. The operation in step S18 is to determine the end point of the calculation disabling period. The threshold (threshold period) Tth is set to, for example, a period (corresponding to a count value); the period is determined to be as narrow as possible and equal to or higher than the period expected to be required for a corresponding phase current to have passed zero level since the shift of the phase of the corresponding phase current.

In other words, the threshold Tth is set to be equal to or lower than a period during which the absolute level of a corresponding phase current is expected to be higher than an absolute level of ripple current generated by shifting the switching state of the inverter IV in microscopic view.

When determining that the counted value of the timer T is equal to or higher than the preset threshold Tth (YES in step S18), the control apparatus 14 sets the calculation disabling flag F to zero, resets the counted value of the timer T to zero, and enables calculation of the rotational angle θ of the motor-generator 10.

On the other hand, when determining any one of: that the operation in step S20 is completed, the control apparatus 14 terminates the task of disabling calculation of the rotational angle θ, and waits the next cycle of execution of the task. Similarly, when determining that there is not timing to shift the phase of the command current vector I1 (NO in step S12), or that the counted value of the timer T is lower than the preset threshold Tth (NO in step S18), the control apparatus 14 terminates the task of disabling calculation of the rotational angle θ, and waits the next cycle of execution of the task.

Specifically, calculation of the rotational angle θ of the motor-generator 10 is disabled until the counted value of the timer T is lower than the threshold Tth.

As described above, the control system 100 according to the first embodiment is configured to manipulate the phase of a current vector for controlling a controlled variable of the motor-generator 10 to reduce zero crossing periods. That is, the configuration reduces periods, during each of which the absolute level of a corresponding phase current is equal to or lower than the preset threshold level. This configuration reduces the zero crossing periods of the three-phase currents, thus achieving the first technical effect of increasing the accuracy of calculating the rotational angle θ of the motor-generator 10.

The control system 100 according to the first embodiment is configured to manipulate the phase of the current vector to maintain the actual torque of the motor 10 before and after the manipulation of the phase of the current vector. This configuration achieves the second technical effect of preventing the reduction in the controllability of the controlled variable (actual torque) of the motor-generator 10 due to the manipulation of the current vector for reducing the zero crossing periods of the three-phase currents.

The control system 100 according to the first embodiment is configured to cyclically perform the pair of: the first task to change the phase of the command current vector in the rotational direction of the motor-generator 10; and the second task to change the phase of the command current vector in the opposite direction of the rotational direction of the motor-generator 10. This configuration achieves the third technical effect of preventing the three-phase currents actually flowing in the motor-generator 10 from being excessively deviated from the command d- and q-axis current components idr1 and iqr1 of the command current vector.

The control system 100 according to the first embodiment is configured to disable calculation of the rotational angle θ of the motor-generator 10 during the threshold period Tth from the point of shifting the phase of the current vector. This configuration achieves the fourth technical effect of preventing the occurrence of errors in the calculated rotational angle θ due to errors in the d-axis high-frequency component to be actually superimposed on the d-axis command voltage during a corresponding zero crossing period.

Second Embodiment

A control system for the motor-generator 10 according to the second embodiment of the present disclosure will be described with reference to FIG. 14.

The structure and/or functions of the control system according to the second embodiment are different from the control system 100 by the following points. So, the different points will be mainly described hereinafter.

Figure 14:
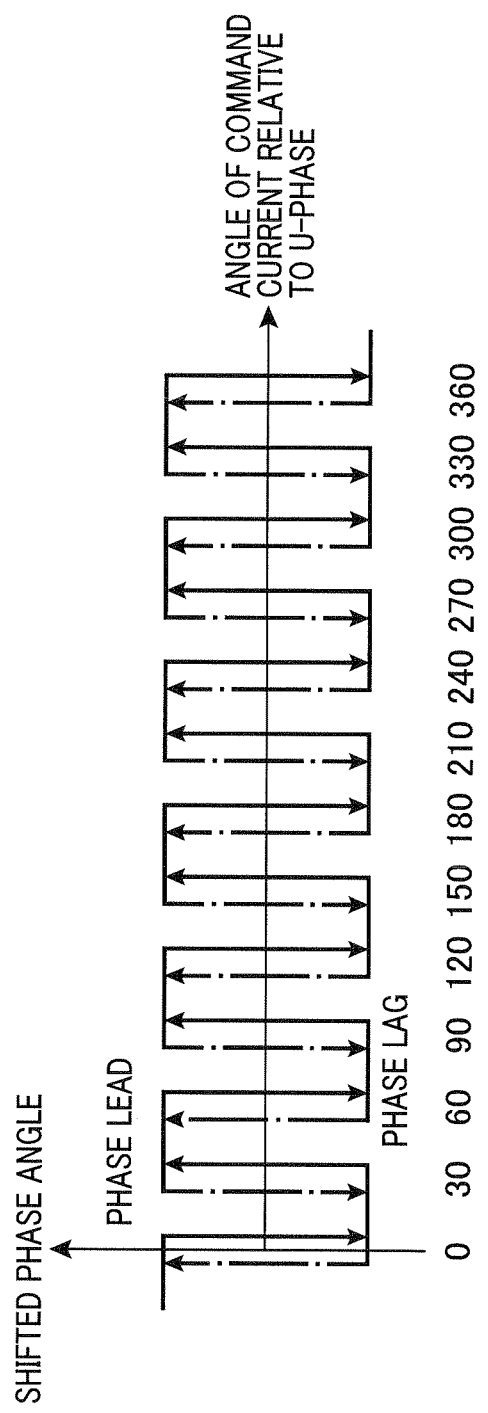
FIG. 14 is a view schematically illustrating how to manipulate the phase of the current vector according to the second embodiment of the present disclosure.

Referring to FIG. 14, the command current changer 21 is configured to manipulate the phase of the command current vector such that timing to shift the phase of the command current vector during forward rotation of the motor-generator 10 is different from timing to shift the phase of the command current vector during reverse rotation thereof. Note that the forward rotation of the motor-generator 10 (see FIGS. 10A and 10B) corresponds to a control mode of the control apparatus 14 in which the inverter IV is energized in the order of the upper-arm U-phase switching element Sup, the upper-arm V-phase switching element Svp, and the upper-arm W-phase switching element Swp. In contrast, the reverse rotation of the motor-generator 10 corresponds to a control mode of the control apparatus 14 in which the inverter IV is energized in the order of the upper-arm W-phase switching element Swp, the upper-arm V-phase switching element Svp, and the upper-arm U-phase switching element Sup.

More specifically, as illustrated in FIG. 14, the command current changer 21 shifts, by the preset phase angle, the phase of the command current vector I1 (idr1, iqr1) alternately in the phase-leading direction and phase-lag direction every time the direction of the command current vector I1 turns by 30 electrical degrees during forward rotation and reverse rotation of the motor-generator 10. At that time, the command current changer 21 controls timing to alternate shift the command current vector I1 in phase-leading direction and phase-lag direction during forward rotation of the motor-generator 10 (see the solid line in FIG. 14) to be different from the timing to alternately shift the phase of the command current vector in phase-leading direction and phase-lag direction during reverse rotation thereof (see the dash-dot line in FIG. 14). For example, the command current changer 21 controls a timing to shift the phase of the command current vector during forward rotation of the motor-generator 10 by a given angle relative to a corresponding timing to shift the phase of the command current vector during reverse rotation thereof.

The configuration of the control system according to the second embodiment provides hysteresis between the phase shift of the command current vector during forward rotation of the motor-generator 10 and that of the command vector during reverse rotation thereof. This achieves the fifth technical effect of preventing hunting in the manipulation of the phase of the command current vector.

Third Embodiment

A control system for the motor-generator 10 according to the third embodiment of the present disclosure will be described with reference to FIG. 15.

The structure and/or functions of the control system according to the third embodiment are different from the control system 100 by the following points. So, the different points will be mainly described hereinafter.

Figure 15:
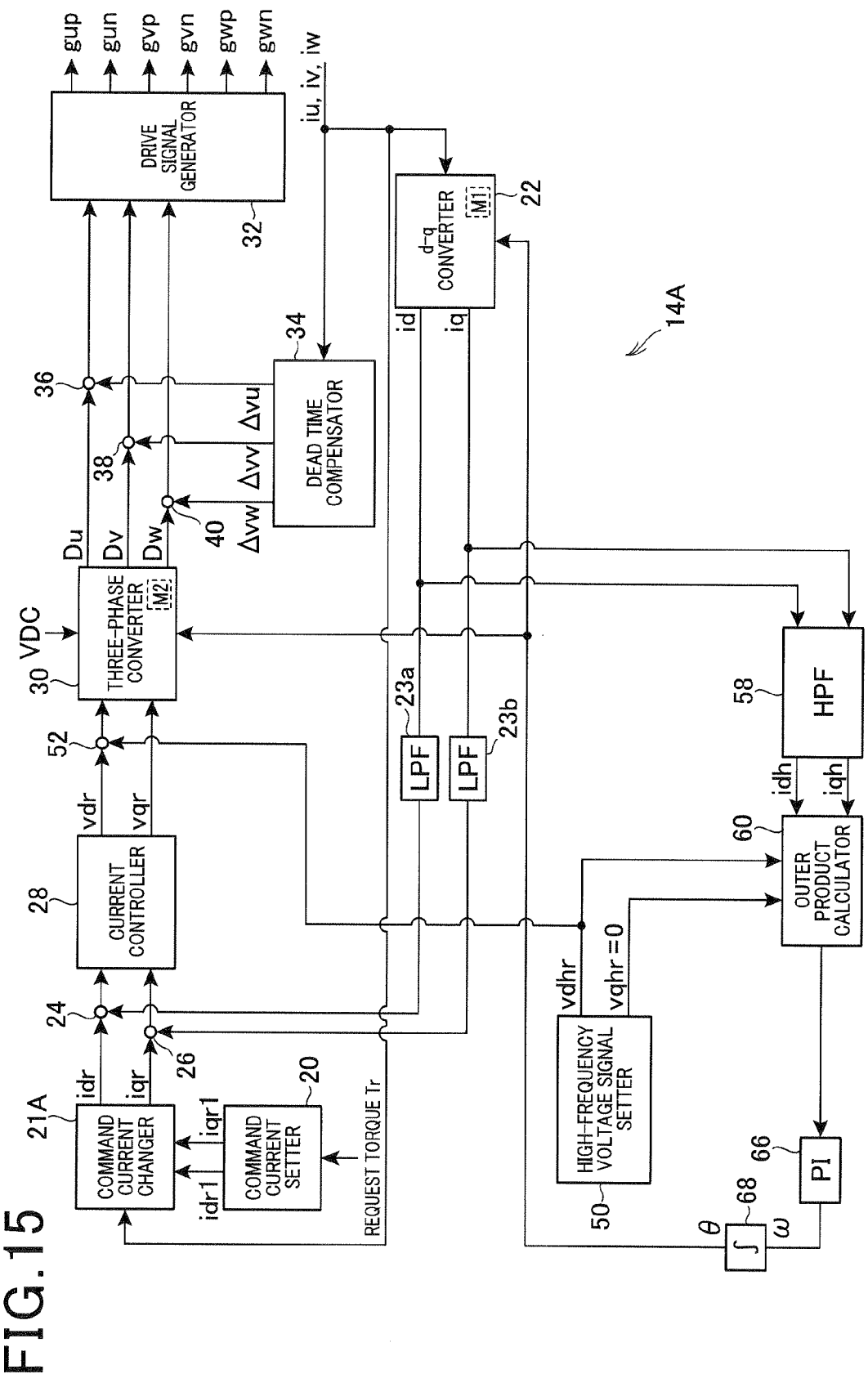
FIG. 15 is a block diagram schematically illustrating functional modules of a control apparatus equivalent to tasks to be executed thereby according to the third embodiment of the present disclosure.

FIG. 15 schematically illustrates functional modules of a control apparatus 14A of the control system, which are equivalent to tasks to be executed by the control apparatus 14A.

The command current changer 21 according to the first embodiment is operative to change the phase of the command d- and q-axis current components idr1 and iqr1 based on the rotational angle θ of the motor-generator 10.

In contrast, the control apparatus 14A according to the third embodiment is configured such that the actual instantaneous U-, V-, and W-phase alternating currents iu, iv, and iw are inputted to a command current changer 21A. The command current 21A is operative to change the phase of the command d- and q-axis current components idr1 and iqr1 based on the three-phase currents iu, iv, and iw actually flowing in the respective phase of the motor-generator 10 in the same manner as the operations of the command current 21 in accordance with FIGS. 10A and 10B.

The control system according to the third embodiment achieves the same technical effects as the control system 100 according to the first embodiment.

Fourth Embodiment

A control system for the motor-generator 10 according to the fourth embodiment of the present disclosure will be described with reference to FIG. 16.

The structure and/or functions of the control system according to the fourth embodiment are different from the control system 100 by the following points. So, the different points will be mainly described hereinafter.

Figure 16:
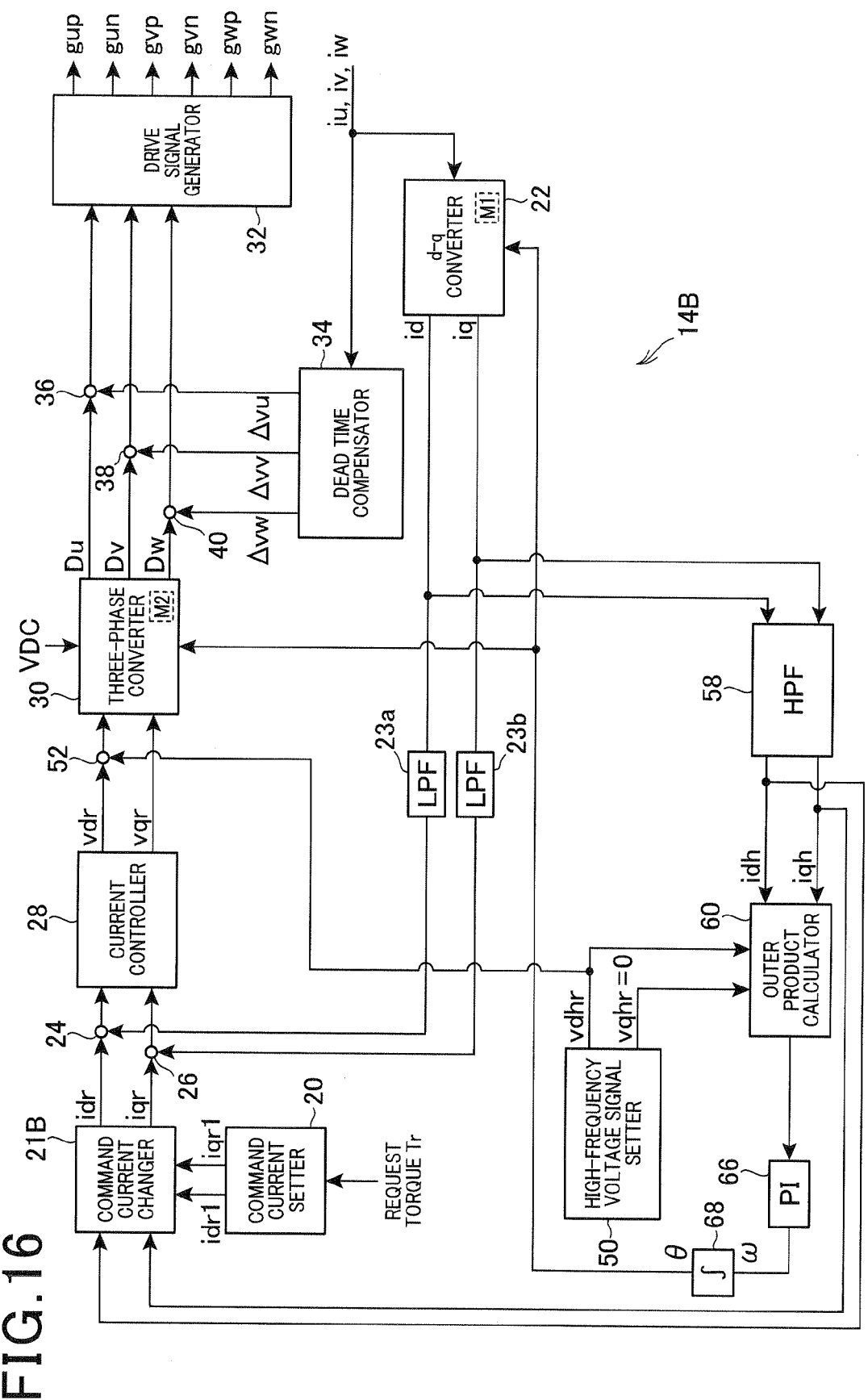
FIG. 16 is a block diagram schematically illustrating functional modules of a control apparatus equivalent to tasks to be executed thereby according to the fourth embodiment of the present disclosure.

FIG. 16 schematically illustrates functional modules of a control apparatus 14B of the control system, which are equivalent to tasks to be executed by the control apparatus 14B.

The control apparatus 14B according to the fourth embodiment is configured such that the high-frequency components idh and iqh are inputted to a command current changer 21B. The command current 21B is operative to change the phase of the command d- and q-axis current components idr1 and iqr1 based on the high-frequency components idh and iqh.

Specifically, the control apparatus 14B (the command current changer 21B) determines timing to shift the phase of the command current vector I1 in phase-leading direction when the norm of the vector of the high-frequency components idh and iqh is equal to or lower than a preset threshold. This immediately passes the current vector I through the no-stay zone NZ. Thereafter, the control apparatus 14B (the command current changer 21B) shifts the phase of the command current vector I1 (idr1, iqr1) in the phase-lag direction. This shifts the corresponding current vector I in the phase-lag direction based on rotation of the direction of the current vector I. This process of the command current changer 21B is based on the concept that the reduction in amplitude of a high-frequency voltage signal to be actually superimposed likely arises if the norm of the vector of the high-frequency components idh and iqh is equal to or lower than the preset threshold as illustrated in FIG. 6.

More precisely, because the vector of the high-frequency command voltage signal (vdhr, vqhr) is not necessarily parallel to the voltage vector of one phase, the high-frequency command voltage signal (vdhr, vqhr) can be superimposed on command voltage vectors of several phases. However, even in this case, the reduction in amplitude of a high-frequency voltage signal to be actually superimposed likely occurs in one phase voltage vector whose electric angle with respect to the vector of the high-frequency command voltage signal is the smallest in the three-phase voltage vectors because the one phase voltage vector corresponds to a phase current crossing zero level. This results in significant reduction in the norm of the vector of the high-frequency components idh and iqh. Thus, it is possible for the command current changer 21B to determine a timing to shift the phase of the command current vector I1 in the phase-leading direction based on the norm of the vector of the high-frequency components idh and iqh.

The control system according to the fourth embodiment achieves the same technical effects as the control system 100 according to the first embodiment.

Fifth Embodiment

A control system for the motor-generator 10 according to the fifth embodiment of the present disclosure will be described with reference to FIG. 17.

The structure and/or functions of the control system according to the fifth embodiment are different from the control system 100 by the following points. So, the different points will be mainly described hereinafter.

Figure 17:
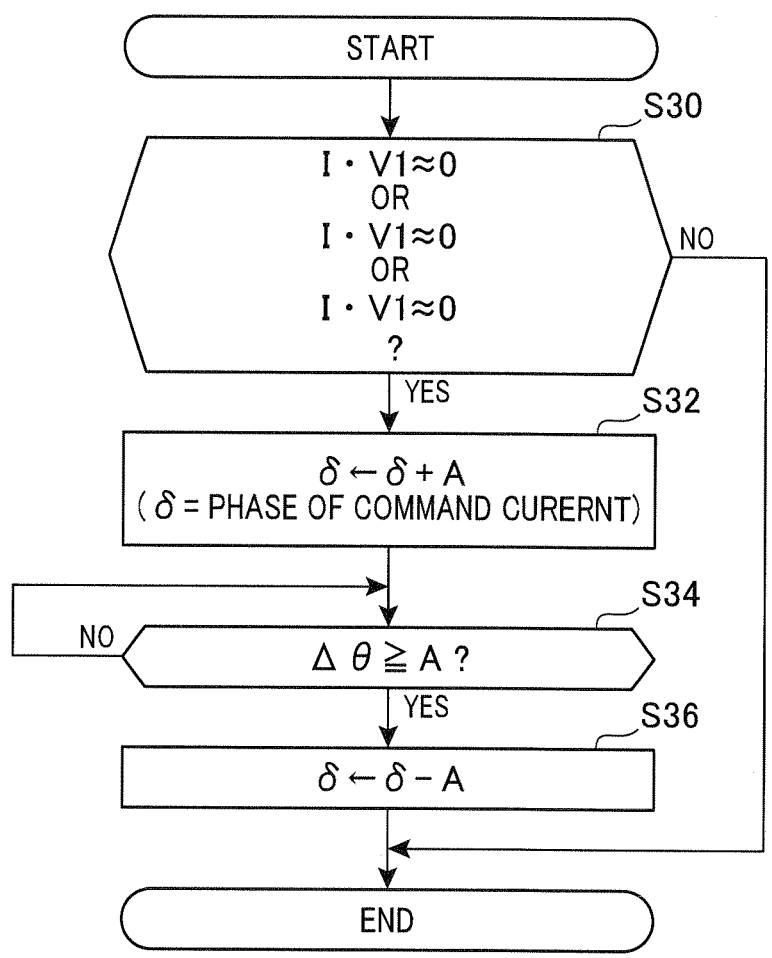
FIG. 17 is a flowchart schematically illustrating the task of shifting the phase of the command d- and q-axis current components according to the fifth embodiment of the present disclosure.

FIG. 17 is a flowchart schematically illustrating the task of shifting the phase of the command d- and q-axis current components idr1 and iqr1 according to the fifth embodiment; the shifting task is to be repeatedly executed by the control apparatus 14 (the command current changer 21) every preset cycle as an example.

In step S30, the control apparatus 14 determines whether the current vector I (iu, iv, iw) flowing in the motor-generator 10 is substantially orthogonal to the positive U-phase voltage vector V1, the positive V-phase voltage vector V3, or the positive W-phase voltage vector V5 in step S30. In other words, the control apparatus 14 determines whether the inner product (dot product) of the current vector I (iu, iv, iw) and any of the positive U-, V-, and W-phase voltage vectors V1, V3, and V5 becomes substantially zero in step S30. Note that the situation that the current vector I (iu, iv, iw) is substantially orthogonal to any of the positive U-, V-, and W-phase voltage vectors V1, V3, and V5 means that the current vector I (iu, iv, iw) enters a corresponding one of the no-stay zones NZ. In other words, the situation means that one phase current enters a corresponding zero crossing period.

When determining that the current vector I (iu, iv, iw) is substantially orthogonal to any of the positive U-, V-, and W-phase voltage vectors V1, V3, and V5 (YES in step S30), the control apparatus 14 shifts the phase δ of the command current vector I1 (idr1, iqr1) by a predetermined quantity (angle) A in the rotational direction of the motor-generator 10 in step S32. In this embodiment, the predetermined angle A is set to be equal to or greater than the angular range of the no-stay zone NZ. It is preferable that the predetermined angle A is set to be as small as possible.

Next, the control apparatus 14 determines whether the change AO in the rotational angle θ of the motor-generator 10 is equal to or greater than the predetermined angle A from the phase shift in step S32 in step S34. When determining that the change Δθ in the rotational angle θ of the motor-generator 10 is smaller than the predetermined angle A (NO in step S34), the control apparatus 14 repeats the determination in step S34.

Otherwise, when determining that the change AO in the rotational angle θ of the motor-generator 10 is equal to or greater than the predetermined angle A (YES in step S34), the control apparatus 14 shifts the phase δ of the command current vector I1 (idr1, iqr1) by the predetermined angle A in the direction opposite to the rotational direction of the motor-generator 10 in step S36. In other words, the control apparatus 14 returns the shift of the phase δ of the command current vector I1 (idr1, iqr1) by the predetermined angle A in the opposite direction of the rotational direction of the motor-generator 10 in step S36.

When the operation in step S36 is completed, or the determination in step S30 is negative, the control apparatus 14 terminates the shifting task, and waits the next cycle of execution of the shifting task.

As described above, the control system according to the fifth embodiment is configured to shift the phase δ of the command current vector I1 (idr1, iqr1) by the predetermined angle A in the rotational direction of the motor-generator 10 only during rotation of the motor-generator 10 by the predetermined angel A. For this reason, the control system uses the command d- and q-axis current components idr1 and iqr1 set by the command current setter 20 as the command d- and q-axis current components idr and iqr to be inputted to the current controller 28 except for the duration of rotation of the motor-generator 10 by the predetermined angel A.

The control system according to the fifth embodiment achieves the same technical effects as the control system 100 according to the first embodiment.

Sixth Embodiment

A control system for the motor-generator 10 according to the sixth embodiment of the present disclosure will be described with reference to FIG. 18.

The structure and/or functions of the control system according to the sixth embodiment are different from the control system 100 by the following points. So, the different points will be mainly described hereinafter.

Figure 18:
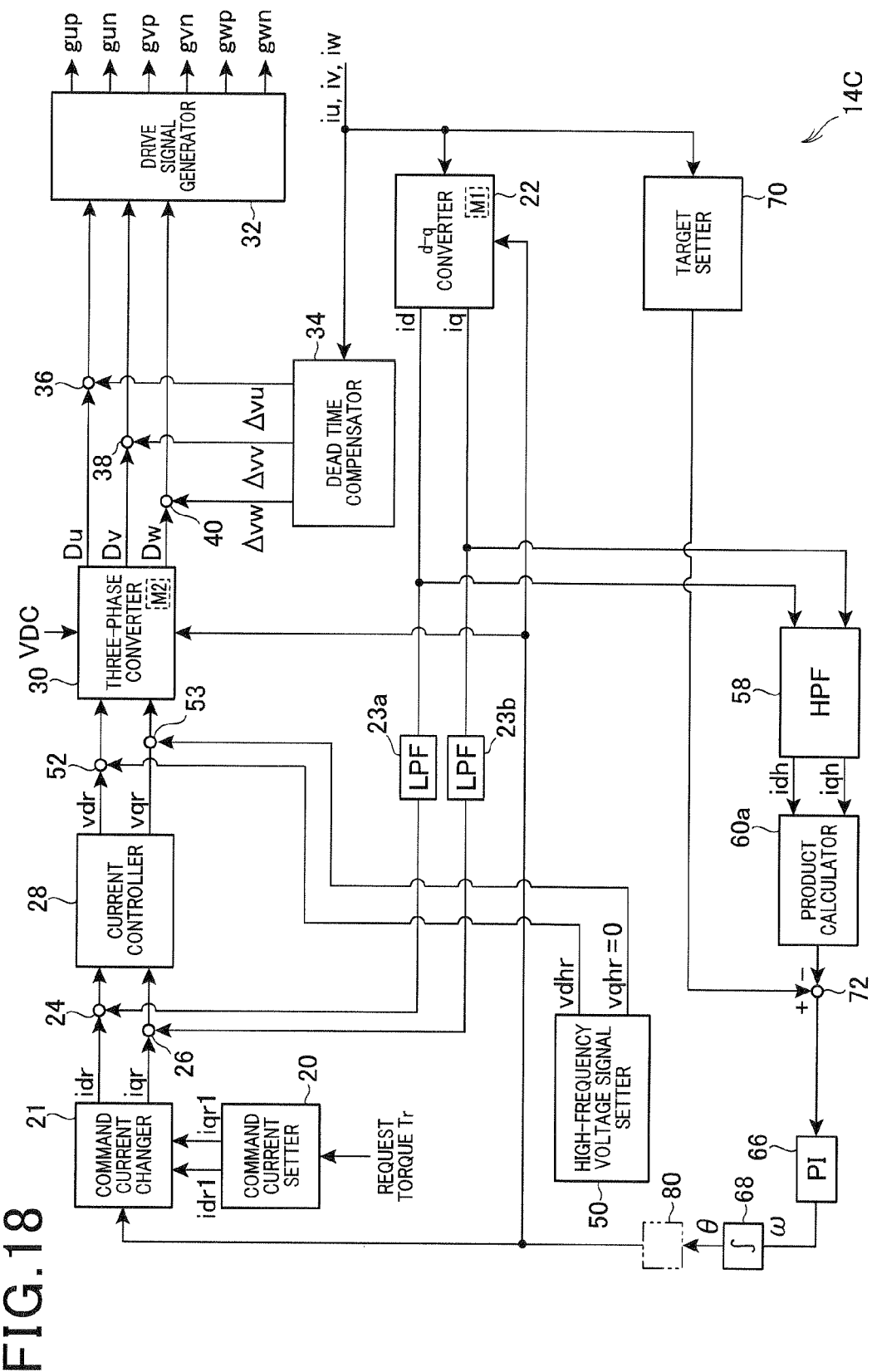
FIG. 18 is a block diagram schematically illustrating functional modules of a control apparatus equivalent to tasks to be executed thereby according to the sixth embodiment of the present disclosure.

Referring to FIG. 18, a control apparatus 14C according to the sixth embodiment is provided with a superimposing unit 53, a product calculator 60a in place of the outer product calculator 60, a target value setter 70 and a deviation calculator 72. The product calculator 60a, target value setter 70, and deviation calculator 72 serve as, for example, an associating element.

The superimposing unit 52 is operative to carry out a first superimposing task to superimpose the d-axis high-frequency component vdhr on the command voltages vdr, and input, to the three-phase converter 30, the commanded voltage vdr. Similarly, the superimposing unit 53 is operative to carry out a second superimposing task to superimpose the q-axis high-frequency component vqhr on the command voltages vqr, and input, to the thee-phase converter 30, the commanded voltage vqr.

In addition, the superimposing units 52 and 53 are configured to alternately carry out the first and second superimposing tasks.

The production calculator 60a is operative to calculate the product of the norm of the vector of the high-frequency components idh and iqh used to superimpose the d-axis high-frequency component vdhr on the command voltages vdr and the norm of the vector of the high-frequency components idh and iqh used to superimpose the q-axis high-frequency component vqhr on the command voltages vqr.

The target calculator 70 is operative to set a target value for the product based on the actual instantaneous U-, V-, and W-phase alternating currents iu, iv, and iw flowing in the motor-generator 10.

Specifically, the control apparatus 14C is configured to manipulate the calculated rotational angle θ to feedback control the product such that the product calculated by the product calculator 60a is matched with the target value set by the target value setter 70.

That is, the control apparatus 14C manipulates the calculated rotational angle θ such that the output of the deviation calculator 72 as the deviation of the calculated product from the target value becomes zero.

Note that, in this embodiment, the target calculator 70 can be operative to set a target value for the product based on the angular velocity ω in addition to the actual instantaneous U-, V-, and W-phase alternating currents iu, iv, and iw.

The control system according to the sixth embodiment achieves a technical effect of calculating the rotational angle θ of the motor-generator 10 with high accuracy even if the correlation between the rotational angle of the motor-generator 10 and each of the high-frequency voltage signal and the high-frequency current signal varies depending on the phase of current flowing in the motor-generator 10 in addition to the technical effects as the control system 100 according to the first embodiment.

Seventh Embodiment

A control system for the motor-generator 10 according to the seventh embodiment of the present disclosure will be described with reference to FIG. 19.

The structure and/or functions of the control system according to the seventh embodiment are different from the control system 100 by the following points. So, the different points will be mainly described hereinafter.

The control apparatus 14 according to the first embodiment is configured to set the target value for the outer product calculated by the outer product calculator 60 to zero. However, the outer product calculated by the outer product calculator 60 can become unequal to zero depending on the configurations of the motor-generator 10 even if there are no errors in the rotational angle θ of the motor-generator 10. Additionally, the outer product, which represents the direction of oscillation of the high-frequency components idh and iqh, can vary depending on the phase of the current vector I to be adjusted to the command d- and q-axis current components idr and iqr determined by the command current changer 21. FIG. 12B described above demonstrates an example of this situation.

In order to address such circumstances, the control system according to this embodiment is configured to set the target value for the outer product to a value except for zero, and changes the target value depending on switching of the phase of the command d- and q-axis current components idr1 and iqr1.

Figure 19:
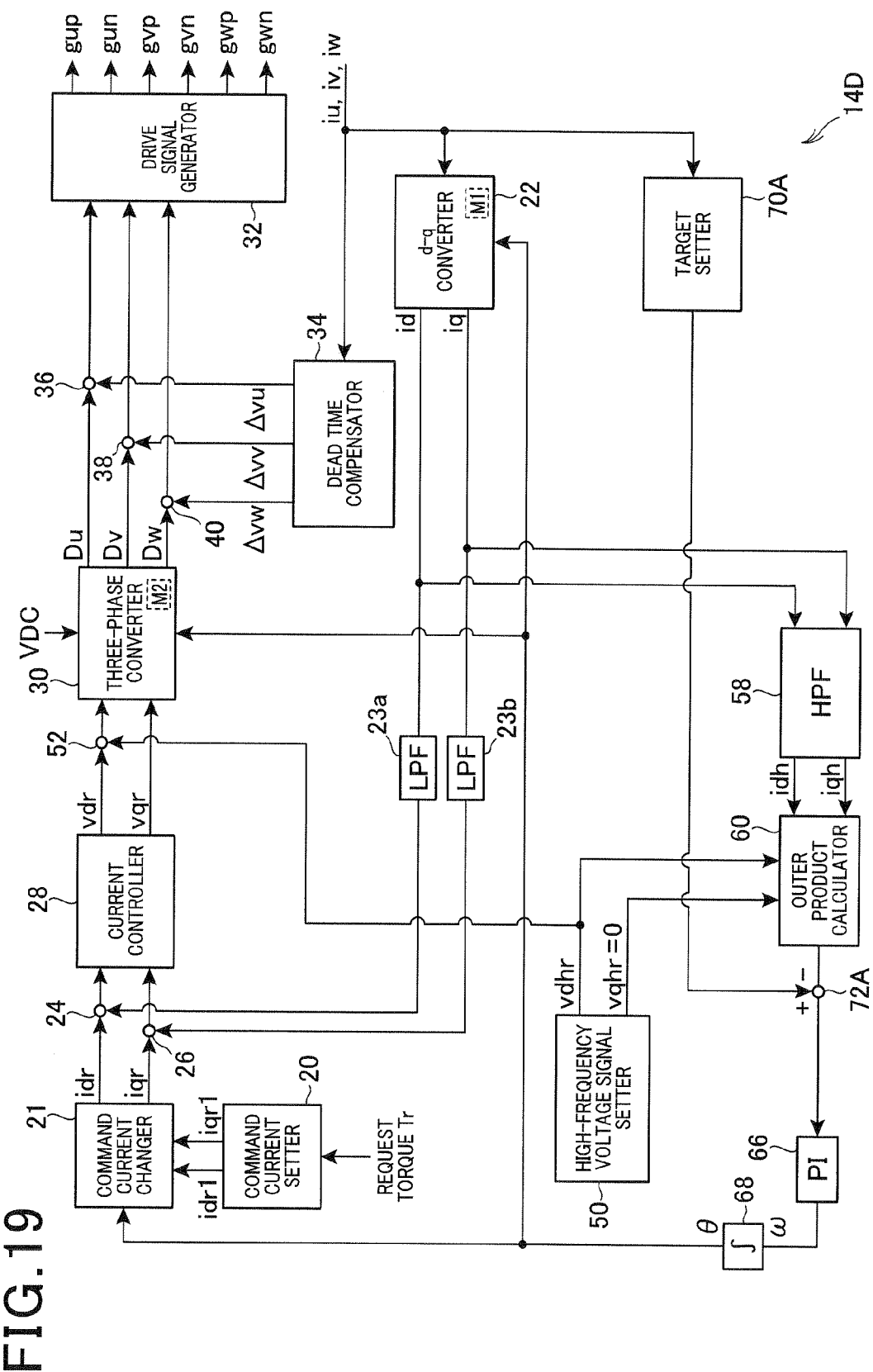
FIG. 19 is a block diagram schematically illustrating functional modules of a control apparatus equivalent to tasks to be executed thereby according to the seventh embodiment of the present disclosure.

Specifically, referring to FIG. 19, a control apparatus 14D according to the seventh embodiment is provided with a target value setter 70A and a deviation calculator 72A.

The target calculator 70A is operative to variably set a target value for the outer product based on the actual instantaneous U-, V-, and W-phase alternating currents iu, iv, and iw flowing in the motor-generator 10.

Specifically, the control apparatus 14D is configured to manipulate the calculated rotational angle θ to feedback control the outer product such that the outer product is matched with the target value set by the target value setter 70A.

That is, the control apparatus 14D manipulates the calculated rotational angle θ such that the output of the deviation calculator 72A as the deviation of the outer product from the target value becomes zero.

The control system according to the seventh embodiment achieves a technical effect of calculating the rotational angle θ of the motor-generator 10 with high accuracy even if the correlation between the rotational angle of the motor-generator 10 and each of the high-frequency voltage signal and the high-frequency current signal varies depending on the phase of current flowing in the motor-generator 10, in addition to the technical effects as the control system 100 according to the first embodiment.

The first to eighth embodiments and their modifications can be changed and/or modified within the scope of the present disclosure.

In the fifth embodiment, the control apparatus 14 serves as a current manipulator to determine whether the current vector I (iu, iv, iw) flowing in the motor-generator 10 enters a corresponding one of the no-stay zones NZ, that is, one phase current enters a corresponding zero crossing period, but the present disclosure is not limited thereto.

Specifically, the control apparatus 14, serving as a current manipulator, can determine whether the current vector I (iu, iv, iw) enters a corresponding one of the no-stay zones NZ (one phase current enters a corresponding zero crossing period) based on the rotational angle θ of the motor-generator 10 and/or the norm of the vector of the high-frequency components idh and iqh. More specifically, the control apparatus 14 can determine that the current vector I (iu, iv, iw) enters a corresponding one of the no-stay zones NZ when the norm of the vector of the high-frequency components idh and iqh is smaller than a preset value.

The control system according to each of the aforementioned embodiments manipulates the phase of the current vector I (iu, iv, iw) flowing in the motor-generator 10, but can manipulate the norm of the current vector I (iu, iv, iw), in other words, the amplitudes of the three-phase currents flowing in the motor-generator 10.

The control system according to each of the aforementioned embodiments disables the calculating task of the rotational angle θ during a preset calculation disabling period from the shift of the phase of a corresponding current vector I, but the present disclosure is not limited thereto. Specifically, the control system cannot disable the calculating task of the rotational angle θ during a preset calculation disabling period from the shift of the phase of a corresponding current vector I. Even if the control system does not disable the calculating task, the control system, which serves as a current manipulator, reduces zero crossing periods to reduce periods during which errors of an angle-correlated parameter are large. The angle-correlated parameter is the outer product according to the first embodiment or the product according to the sixth embodiment, which has a correlation with an angle formed by the vector of the high-frequency command voltage signal Vhr and the vector of the high-frequency components idh and iqh.

For this reason, when estimating the rotational angle θ based on the output of the proportional and integral element (the velocity calculator 66) using the angle-correlated parameter as its input, it is possible to probably reduce a drop in accuracy of calculation of the rotational angle θ.

In the sixth and seventh embodiments, as the input parameter to the target setter 70, the command d- and q-axis current components idr and iqr can be used in place of the actual instantaneous U-, V-, and W-phase alternating currents iu, iv, and iw.

The control system according to each of the sixth and seventh embodiments associates the phase of current flowing in the motor-generator 10 with the high-frequency current signal (idh, iqh) using the target calculator 70 illustrated in a corresponding one of FIGS. 18 and 19 in calculating the rotational angle θ, but the present disclosure is not limited thereto.

For example, the control system according to the present disclosure can be provided with a corrector 80 illustrated as a phantom line in FIG. 18. The corrector 80 can be configured to calculate, based on the phase of current flowing in the motor-generator 10, a correction angle for correcting the rotational angle θ estimated by the angle calculator 68, and to determine the corrected rotational angle θ as a final calculated rotational angle of the motor-generator 10.

However, when the control system according to this modification uses a proportional and integral element, that is the velocity calculator 66, for feedback controlling the angular-correlated parameter calculated based on the high-frequency current signal to a target value, the control system may have a demerit of the output of the proportional and integral element being unset. In order to avoid such a demerit, the control system according to the present disclosure can be modified as follows. Specifically, the high-frequency voltage signal setter 50 can rotate, according to the phase of current flowing in the motor-generator 10, the vector of the high-frequency voltage signal to be used for calculation of the outer product, which is not actually superimposed on the on the command voltage vdr. Alternatively, the command current changer 21 can rotate, according to the phase of current flowing in the motor-generator 10, the vector of the actual instantaneous U-, V-, and W-phase alternating currents iu, iv, and iw.

As another modification, the control system according to the present disclosure can be configured such that the high-frequency voltage signal setter 50 turns, according to the phase of current flowing in the motor-generator 10, the vector of the high-frequency voltage signal to be actually superimposed on the on the command voltage vdr.

These modifications achieve the same technical effects as each of the sixth and seventh embodiments even if the target value for the outer product is fixed to a preset value.

As a dead-time compensating element, the dead-time compensator 34 performs feedforward control of the respective duty signals Du, Dv, and Dw based on the polarities of the corresponding phase currents iu, iv, and iw, but the present disclosure is not limited thereto. Specifically, the dead-time compensator 34 can be configured to perform feedback control of a measured voltage of the output voltage of the inverter IV for each phase to a command voltage for a corresponding phase. In this modification, if the rising edge and the falling edge of each of the drive signals is shifted by a preset time (dead time), it is possible to prevent an error from being included in the high-frequency voltage signal within periods except for during zero crossing periods.

The current feedback control illustrated in FIG. 2 can compensate for the deviation of a line voltage defined based on a PWM signal g* before correction from that defined based on a corrected PWM signal g* due to dead time if no phase currents cross zero level.

The control system according to the present disclosure can eliminate the dead-time compensating element, which adjusts, to zero, an error in a command voltage due to dead time as a direct controlled variable. In this modification, the current feedback control function illustrated in FIG. 2, which feedback controls a controlled variable of the motor-generator 10, can include the dead-time compensating function. Specifically, the current feedback control function corrects an error in an average line voltage over one PWM cycle Tc because the error is due to an error in the controlled variable based on an error in each phase voltage due to dead time. As described above, the current feedback control function based on comparison between in magnitude between the corrected duty signals Du, Dv, and Dw and a cyclic triangular carrier shifts each of the rising edge and falling edge of a corresponding PWM signal g* by a same time. For this reason, if no phase currents cross zero level, the current feedback control function can completely compensate for an error in an average line voltage over one PWM cycle Tc.

On the other hand, if a phase current crosses zero level, there are no errors in the corresponding phase voltage, and the phase shift of the corresponding phase voltage does not cause an error in an average line voltage over one PWM cycle Tc. For this reason, this modification can be identically handled in the same manner as each of the aforementioned embodiments. Note that the occurrence of an error in an average line voltage within a period during which no phase currents cross zero level can be prevented only after the correction of the controlled variable based on the feedback control function is completed.

As a rotary machine, a three-phase rotary machine having three-phase armature windings (U-, V-, and W-phase windings) is used, but the present disclosure is not limited thereto. Specifically, a multiphase rotary machine having four or more armature windings can be used.

In each of the aforementioned embodiments, update timing for each of the command voltages vur, vvr, and vwr is synchronized with a positive peak of the carrier CS, but it can be synchronized with a negative peak of the carrier CS.

The carrier CS is not limited to a cyclic triangular carrier. Any symmetric carrier, whose amplitude rises in a given velocity in a given period and falls in the same velocity in the same period, can be used. In this modification, it is easy to shift the rising edge and the falling edge of each of the drive signals a preset time (dead time).

The command d- and q-axis current components (idr1, iqr1) set by the command current setter 20 are not limited to levels required to carry out maximum torque control to achieve maximum torque output with minimum armature current, but the present disclosure is not limited thereto. Specifically, the command d- and q-axis current components (idr1, iqr1) set by the command current setter 20 can be set to levels required to carry out maximum efficiency control for maintaining the maximum efficiency (minimum loss) of the motor-generator 10. As another example, the command d- and q-axis current components (idr1, iqr1) set by the command current setter 20 can be set to levels required to carry out "id=0 control" for easy linear control of torque of the motor-generator 10.

A final controlled variable of the motor-generator 10 is not limited to actual torque (output torque) of the motor-generator 10. Specifically, as a final controlled variable of the motor-generator 10, the rotational speed of the motor-generator 10 can be used.

In each of the aforementioned embodiments, as the salient-pole rotary machine, an IPMSM is used, but another type of salient-pole rotary machines, such as a Synchronous Reluctance Motor, can be used.

Various types of rotary machines according to the present disclosure can be installed in various types of vehicle, such as an electric automobile. Various types of rotary machines to which the present invention can be applied are not limited to a component of a drive system of vehicles, such as a rotary machine to be installed in a power steering system.

Particularly, in each of the embodiments, the control system is configured to control a controlled variable of a rotary machine (an IPMSM) installed in a motor vehicle and serving as an energy source thereof. Such a rotary machine installed in a motor vehicle and serving as an energy source thereof use high power. For this reason, when the control system according to each of the embodiments superimposes a high-frequency voltage signal on an output voltage of the inverter IV, noise audibly recognizable by humans is likely created. For this reason, there are great requirements to reduce the high-frequency voltage signal while an error arises in a high-voltage signal to be actually superimposed. Thus, the control system according to each of the embodiments, which serves as means for compensating for an error in a high-voltage signal to be actually superimposed due to dead time and as means for manipulating a current flowing in the rotary machine to maintain an accuracy of calculation of the rotational angle of the rotary machine, achieves major advantage.

Note that, in the present disclosure, the high-frequency voltage signal setter 50 and the superimposing unit 52 serve as, for example, a superimposing element (a superimposing module). The high-frequency voltage signal setter 50 and the superimposing units 52 and 53 can also serve as, for example, a superimposing element (a superimposing module). In the present disclosure, the high-pass filter 58, the outer product calculator 60, the velocity calculator 66, and the angle calculator 68 serve as, for example, a calculating element. The high-pass filter 58, the outer product calculator 60 (or the product calculator 60a), the velocity calculator 66, the angle calculator 68, the target setter 70, and the deviation calculator 72 can also serve as, for example, a calculating element. In the present disclosure, the dead time compensator 34 serves as, for example, a dead-time compensating element, and one of the command current changers 21, 21A and 21B serves as, for example, a current manipulating element.

While illustrative embodiments of the present disclosure has been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A system for a salient-pole multi-phase rotary machine, the system driving, based on a PWM signal for each phase of the salient-pole multi-phase rotary machine, an inverter equipped with a first switching element, a first diode connected in antiparallel to the first switching element, a second switching element, and a second diode connected in antiparallel to the second switching element, so that the inverter connects a terminal of the salient-pole multi-phase rotary machine selectively to one of a positive terminal and a negative terminal of a direct voltage power supply via the respective first and second switching elements to thereby control a controlled variable of the rotary machine, the first and second switching elements being turned on or off with a dead time during which both the first and second switching elements are off, the system comprising:

a superimposing element configured to superimpose a high-frequency voltage signal on an output voltage of the inverter, the high-frequency voltage signal having a frequency higher than an electrical angular frequency of the rotary machine, the high-frequency voltage signal being correlated with a measured value of a high-frequency current signal flowing in the rotary machine;

a calculating element configured to calculate a rotational angle of the rotary machine based on the measured high-frequency the current signal flowing in the rotary machine;

a dead-time compensating element configured to perform a compensation task that shifts a start edge and an end edge of an on-command duration of the PWM signal for each of the first and second switching elements by a preset same time to compensate for a first error;

the first error being generated between the high-frequency voltage signal actually superimposed on the output voltage of the inverter and the command value for the high-frequency voltage signal due to change of the PWM signal by the dead time; and a current manipulating element configured to manipulate a command current for controlling the controlled variable of the rotary machine to prevent the calculating element from calculating the rotational angle of the rotary machine based on the measured high-frequency current signal flowing in the rotary machine, the measured high-frequency current signal including a second error, the second error being generated based on difference in lyase between the PWM signal for one phase current that crosses through zero level and the PWM signal for another phase current, the second error being generated between the high-frequency voltage signal actually superimposed on the output voltage of the inverter and the command value for the high-frequency voltage signal even after the compensation task is performed by the dead-time compensating element.

2. The system according to claim 1, wherein the current measuring element is configured to manipulate a vector of the command current for controlling the controlled variable of the rotary machine to manipulate the current flowing in the rotary machine, thus reducing a zero crossing period during which an absolute level of the current flowing in the rotary machine is equal to or lower than a preset threshold level.

3. The system according to claim 2, wherein the preset threshold level is set to be equal to or higher than a level of a ripple current generated by the selective connections of the first and second switches of the inverter.

4. The system according to claim 2, wherein the current manipulating element is configured to manipulate the phase of the vector of the command current to maintain torque of the rotary machine before and after the manipulation of the phase of the vector of the command current.

5. The system according to claim 2, wherein the current manipulating element is configured to cyclically carry out: a first task to change the phase of the vector of the command current in a rotational direction of the rotary machine, and a second task to change the phase of the vector of the command current in an opposite direction of the rotational direction of the rotary machine.

6. The system according to claim 5, wherein the current manipulating element is configured to switch between the first and second tasks based on the calculated rotational angle of the rotary machine.

7. The system according to claim 5, wherein the current manipulating element is configured to switch between the first and second tasks based on the one-phase current flowing in the rotary machine.

8. The system according to claim 2, wherein the calculating element further comprises an associating element configured to associate each of the high-frequency voltage signal and the measured high-frequency current signal with the rotational angle of the rotary machine based on the phase of the vector of the command current manipulated by the current manipulating element.

9. The system according to claim 1, wherein the current manipulating element is configured to:

change a phase of a vector of the command current for controlling the controlled variable of the rotary machine while the vector of the command current is substantially orthogonal to a predetermined direction of one phase of the rotary machine; and reverse the phase of the vector of the command current when the vector of the command current is non-orthogonal to the predetermined direction of the one phase of the rotary machine.

10. The system according to claim 1, wherein the current manipulating element is configured to change a phase of a vector of the command current for controlling the controlled variable of the rotary machine when the measured high-frequency current signal is equal to or lower than a preset threshold.

11. The system according to claim 1, wherein the current manipulating element is configured to change a phase of a vector of the command current for controlling the controlled variable of the rotary machine, the system further comprising:

a disabling element configured to disable calculation of the rotational angle of the rotary machine over a preset period from a point of change of the phase of the vector of the command current.

12. The system according to claim 1, wherein the rotary machine is installed in a vehicle as an energy source of the vehicle.

13. A system for a salient-pole multi-phase rotary machine, the system driving, based on a PWM signal for each phase of the salient-pole multi-phase rotary machine, an inverter equipped with a first switching element, a first diode connected in antiparallel to the first switching element, a second switching element, and a second diode connected in antiparallel to the second switching element, so that the inverter connects a terminal of the salient rotary machine selectively to one of a positive terminal and a negative terminal of a direct voltage power supply via the respective first and second switching elements to thereby control a controlled variable of the rotary machine, the first and second switching elements being turned on or off with a dead time during which both the first and second switching elements are off, the system comprising:

a superimposing element configured to superimpose a high-frequency voltage signal on an output voltage of the inverter, the high-frequency voltage signal having a frequency higher than an electrical angular frequency of the rotary machine, the high-frequency voltage signal being correlated with a measured value of a high-frequency current signal flowing in the rotary machine;

a calculating element configured to calculate a rotational angle of the rotary machine based on the measured high-frequency current signal flowing in the rotary machine;

a dead-time compensating element configured to perform a compensation task that shifts a start edge and an end edge of an on-command duration of the PWM signal for each of the first and second switching elements by a preset same time to compensate for a first error;

the first error being generated between she high-frequency voltage signal actually superimposed on the output voltage of the inverter and the command value for the high-frequency voltage signal due to change of the PWM signal by the dead time; and a current manipulating element configured to manipulate a command current for controlling the controlled variable of the rotary machine to reduce a second error, the second error being venerated based on difference in phase between the PWM signal for one phase current that crosses through zero level and the PWM signal for another phase current, the second error being generated between the high-frequency voltage signal actually superimposed on the output voltage of the inverter and the command value for the high-frequency voltage signal even after the compensation task is performed by the dead-time compensating element.

14. The system according to claim 13, wherein the current measuring element is configured to manipulate a vector of the command current to reduce a zero crossing period during which an absolute level of the current flowing in the rotary machine is equal to or lower than a preset threshold level.

15. The system according to claim 14, wherein the preset threshold level is set to be equal to or higher than a level of a ripple current generated by the selective connections of the first and second switches of the inverter.

16. The system according to claim 14, wherein the current manipulating element is configured to manipulate the phase of the vector of the command current to maintain torque of the rotary machine before and after the manipulation of the phase of the vector of the command current.

17. The system according to claim 13, wherein the current manipulating element is configured to change a phase of a vector of the command current, the system further comprising:
a disabling element configured to disable calculation of the rotational angle of the rotary machine over a preset period from a point of change of the phase of the vector of the command current.

* * * * *

UNITED STATES PATENT AND TRADEMARK OFFICE
CERTIFICATE OF CORRECTION

PATENT NO. : 9,013,137 B2  
APPLICATION NO. : 13/406883  
DATED : April 21, 2015  
INVENTOR(S) : Aoki et al.

Page 1 of 1

It is certified that error appears in the above-identified patent and that said Letters Patent is hereby corrected as shown below:

In the Claims

Claim 1, Column 26, line 63 delete "the" after -- frequency -- and before -- current signal --

Claim 1, Column 27, line 17 delete "lyase" and insert -- phase -- before -- between the PWM signal --

Claim 13, Column 28, line 56 delete "she" and insert -- the -- after -- the first error being generated -- and before -- high-frequency --

Claim 13, Column 28, line 64 delete "venerated" and insert -- generated -- after -- the second error being -- and before -- based on difference in --

Signed and Sealed this  
Twenty-second Day of September, 2015

Michelle K. Lee  
*Director of the United States Patent and Trademark Office*